(12) United States Patent
He et al.

(10) Patent No.: US 12,494,082 B2
(45) Date of Patent: Dec. 9, 2025

(54) FACE IMAGE PROCESSING METHOD, FACE IMAGE PROCESSING MODEL TRAINING METHOD, APPARATUS, DEVICE, STORAGE MEDIUM, AND PROGRAM PRODUCT

(71) Applicant: Tencent Technology (Shenzhen) Company Limited, Shenzhen (CN)

(72) Inventors: Keke He, Shenzhen (CN); Junwei Zhu, Shenzhen (CN); Yandan Zhao, Shenzhen (CN); Xu Chen, Shenzhen (CN); Ying Tai, Shenzhen (CN); Chengjie Wang, Shenzhen (CN); Jilin Li, Shenzhen (CN); Feiyue Huang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 350 days.

(21) Appl. No.: 18/070,301

(22) Filed: Nov. 28, 2022

(65) Prior Publication Data
US 2023/0100427 A1 Mar. 30, 2023

Related U.S. Application Data

(63) Continuation of application No. PCT/CN2022/111744, filed on Aug. 11, 2022.

(30) Foreign Application Priority Data

Aug. 20, 2021 (CN) .......................... 202110963370.5

(51) Int. Cl.
G06V 40/16 (2022.01)
G06V 10/80 (2022.01)

(52) U.S. Cl.
CPC .......... *G06V 40/168* (2022.01); *G06V 10/806* (2022.01)

(58) Field of Classification Search
CPC .... G06V 40/168; G06V 10/806; G06V 40/16; G06V 10/751; G06V 10/75;
(Continued)

(56) References Cited

U.S. PATENT DOCUMENTS 8,553,037 B2 * 10/2013 Smith ..................... G06T 13/40
345/473
10,235,814 B2 * 3/2019 Romdhani .............. G06T 7/337
(Continued)

FOREIGN PATENT DOCUMENTS

CN 108776983 A 11/2018
CN 110543845 A 12/2019
(Continued)

OTHER PUBLICATIONS

Zhang; Xuehai, et al. "ControlFace: Feature Disentangling for Controllable Face Swapping", MBPI, Jan. 2024 (Year: 2024).*
(Continued)

*Primary Examiner* — Aaron W Carter
*Assistant Examiner* — Alejandro Hernandez
(74) *Attorney, Agent, or Firm* — Morgan, Lewis & Bockius LLP

(57) ABSTRACT

This application discloses a face image processing method performed by an electronic device. The method includes: acquiring a face image of a source face and a face template image of a template face; performing three-dimensional face modeling on the face image and the face template image to obtain a three-dimensional face image feature of the face image and a three-dimensional face template image feature of the face template image; fusing the three-dimensional face image feature and the three-dimensional face template
(Continued)

image feature to obtain a three-dimensional fusion feature; performing face replacement feature extraction on the face image based on the face template image to obtain an initial face replacement feature; transforming the initial face replacement feature based on the three-dimensional fusion feature to obtain a target face replacement feature; and replacing the template face with the source face based on the target face replacement feature to obtain a target face image.

17 Claims, 9 Drawing Sheets

(58) Field of Classification Search
CPC .. G06V 40/172; G06V 40/165; G06V 40/161; G06V 40/174; G06F 18/21; G06F 18/214; G06F 18/25; G06F 18/253; G06F 18/20; G06T 17/00; G06T 3/04; G06T 3/14; G06T 5/50; G06T 15/00; G06T 11/60; G06T 5/77; G06T 7/40
See application file for complete search history.

(56) References Cited

U.S. PATENT DOCUMENTS

| | | | | |
|---|---|---|---|---|
| 10,599,914 | B2* | 3/2020 | Li | G06V 40/171 |
| 11,455,729 | B2* | 9/2022 | Gao | G06V 40/174 |
| 11,582,519 | B1* | 2/2023 | Bhat | H04N 21/4666 |
| 11,887,320 | B1* | 1/2024 | Sullivan | G01B 11/2518 |
| 12,262,068 | B1* | 3/2025 | Libin | H04N 21/2187 |
| 2013/0129158 | A1* | 5/2013 | Wang | G06T 11/00 382/118 |
| 2017/0169358 | A1* | 6/2017 | Choi | G06N 20/00 |
| 2019/0122329 | A1 | 4/2019 | Wang et al. | |
| 2019/0171869 | A1* | 6/2019 | Fortune | G06T 7/00 |
| 2020/0160595 | A1 | 5/2020 | Lv et al. | |
| 2020/0302670 | A1 | 9/2020 | Chen | |
| 2021/0150726 | A1* | 5/2021 | Kao | G06T 7/168 |
| 2021/0166088 | A1* | 6/2021 | Chen | G06V 40/171 |
| 2022/0005487 | A1* | 1/2022 | Sung | G06N 3/045 |
| 2023/0316607 | A1* | 10/2023 | He | G06V 40/168 382/308 |
| 2023/0410447 | A1* | 12/2023 | Cheng | G06T 7/50 |
| 2024/0249431 | A1* | 7/2024 | Lu | G06V 10/82 |
| 2024/0282149 | A1* | 8/2024 | Yang | G06V 10/82 |
| 2024/0320967 | A1* | 9/2024 | Nie | G11B 27/34 |
| 2025/0024093 | A1* | 1/2025 | Wang | G06F 3/0488 |
| 2025/0054105 | A1* | 2/2025 | Xu | G06T 5/50 |
| 2025/0069183 | A1* | 2/2025 | Ma | G06F 18/00 |
| 2025/0150677 | A1* | 5/2025 | Lin | H04N 21/475 |

FOREIGN PATENT DOCUMENTS

| | | | | |
|---|---|---|---|---|
| CN | 111368796 | A | | 7/2020 |
| CN | 111553267 | A * | 8/2020 | ........... G06F 18/214 |
| CN | 111783603 | A | | 10/2020 |
| CN | 111860167 | A | | 10/2020 |
| CN | 112257657 | A | | 1/2021 |
| CN | 113240792 | A | | 8/2021 |
| JP | 2004534330 | A * | 11/2004 | ............ H04N 23/64 |
| JP | 2014149677 | A | | 8/2014 |
| JP | 2020177605 | A | | 10/2020 |
| JP | 2021073619 | A | | 5/2021 |
| KR | 20130094880 | A | | 8/2013 |
| WO | WO 2017041289 | A1 | | 3/2017 |
| WO | WO-2019233229 | A1 * | 12/2019 | ............... G06T 3/60 |
| WO | WO 2020173329 | A1 | | 9/2020 |
| WO | WO-2025076259 | A1 * | 4/2025 | ........... G06F 3/0484 |

OTHER PUBLICATIONS

Tencent Technology, WO, PCT/CN2022/111744, Nov. 9, 2022, 4 pgs.
Tencent Technology, IPRP, PCT/CN2022/111744, Feb. 13, 2024, 5 pgs.
Tencent Technology, Japanese Office Action, JP Patent Application No. 2022565902, Dec. 11, 2023, 6 pgs.
Tencent Technology, ISR, PCT/CN2022/111744, Nov. 9, 2022, 2 pgs.
Tennent Technology, Indian Office Action, IN Patent Application No. 202237069104. Jul. 31, 2025, 9 pgs.

* cited by examiner

FACE IMAGE PROCESSING METHOD, FACE IMAGE PROCESSING MODEL TRAINING METHOD, APPARATUS, DEVICE, STORAGE MEDIUM, AND PROGRAM PRODUCT

CROSS-REFERENCE TO RELATED APPLICATIONS

This application is a continuation application of PCT Patent Application No. PCT/CN2022/111744, entitled "FACIAL IMAGE PROCESSING METHOD, TRAINING METHODS FOR FACIAL IMAGE PROCESSING MODELS, DEVICES, DEVICES, STORAGE MEDIA AND PROGRAM PRODUCTS" filed on Aug. 11, 2022, which claims priority to Chinese Patent Application No. 202110963370.5, filed with the State Intellectual Property Office of the People's Republic of China on Aug. 20, 2021, and entitled "FACE IMAGE PROCESSING METHOD, FACE IMAGE PROCESSING MODEL TRAINING METHOD, APPARATUS, DEVICE, STORAGE MEDIUM, AND PROGRAM PRODUCT", all of which are incorporated herein by reference in their entirety.

FIELD OF THE TECHNOLOGY

This application relates to the field of computer technologies, and in particular, to a face image processing method and apparatus, a face image processing model training method and apparatus, a device, a storage medium, and a program product.

BACKGROUND OF THE DISCLOSURE

With the development of technologies, in applications such as film special effects and Internet social networking, when a style of an object in a face image is retained, there is a need to replace a face of the object with a face of another object. To meet the need, the face image needs to be processed.

Face image processing methods in the related art only consider retaining identity of faces, leading to low accuracy of face image processing.

SUMMARY

Embodiments of this application provide a face image processing method and apparatus, a face image processing model training method and apparatus, a computer device, a computer-readable storage medium, and a computer program product, which improve accuracy of face image processing.

An embodiment of this application provides a face image processing method, performed by a computer device, the method including:
  acquiring a face image of a source face and a face template image of a template face;
  performing three-dimensional face modeling on the face image and the face template image to obtain a three-dimensional face image feature of the face image and a three-dimensional face template image feature of the face template image;
  fusing the three-dimensional face image feature and the three-dimensional face template image feature to obtain a three-dimensional fusion feature;
  performing face replacement feature extraction on the face image based on the face template image to obtain an initial face replacement feature;
  transforming the initial face replacement feature based on the three-dimensional fusion feature to obtain a target face replacement feature; and
  replacing the template face in the face template image with the source face based on the target face replacement feature to obtain a target face image after the replacement.

An embodiment of this application further provides a face image processing apparatus, including:
  a first acquisition unit configured to acquire a face image of a source face and a face template image of a template face;
  a three-dimensional face modeling unit configured to perform three-dimensional face modeling on the face image and the face template image to obtain a three-dimensional face image feature of the face image and a three-dimensional face template image feature of the face template image;
  a first fusion unit configured to fuse the three-dimensional face image feature and the three-dimensional face template image feature to obtain a three-dimensional fusion feature;
  a feature extraction unit configured to perform face replacement feature extraction on the face image based on the face template image to obtain an initial face replacement feature;
  a transformation unit configured to transform the initial face replacement feature based on the three-dimensional fusion feature to obtain a target face replacement feature; and
  a first replacement unit configured to replace the template face in the face template image with the source face based on the target face replacement feature to obtain a target face image after the replacement.

An embodiment of this application further provides a face image processing model training method, including:
  acquiring a training image sample group, the training image sample group including a face image sample, a face template image sample, and a face reference image sample;
  replacing, by using a face image processing model, a template face in the face template image sample with a source face in the face image sample to obtain a predicted face image;
  performing three-dimensional face contour point detection on the predicted face image to obtain three-dimensional face contour points of the predicted face image, and performing three-dimensional face contour point detection on the face reference image sample to obtain three-dimensional face contour points of the face reference image sample;
  acquiring differences between the three-dimensional face contour points of the predicted face image and the three-dimensional face contour points of the face reference image sample to obtain a face contour loss between the predicted face image and the face reference image sample; and
  updating a model parameter of the face image processing model based on the face contour loss.

An embodiment of this application further provides a face image processing model training apparatus, including:
  a second acquisition unit configured to acquire a training image sample group, the training image sample group including a face image sample, a face template image sample, and a face reference image sample;

a second replacement unit configured to replace, by using a face image processing model, a template face in the face template image sample with a source face in the face image sample to obtain a predicted face image;

a three-dimensional face contour point detection unit configured to perform three-dimensional face contour point detection on the predicted face image to obtain three-dimensional face contour points of the predicted face image, and perform three-dimensional face contour point detection on the face reference image sample to obtain three-dimensional face contour points of the face reference image sample;

a calculation unit configured to acquire differences between the three-dimensional face contour points of the predicted face image and the three-dimensional face contour points of the face reference image sample to obtain a face contour loss between the predicted face image and the face reference image sample; and an adjustment unit configured to update a model parameter of the face image processing model based on the face contour loss.

According to an aspect of the embodiments of this application, a computer program product or a computer program is provided, the computer program product or the computer program including computer instructions, the computer instructions being stored in a computer-readable storage medium; a processor of a computer device reads the computer instructions from the computer-readable storage medium, and executes the computer instructions, to implement the foregoing method according to the embodiment of this application.

An embodiment of this application further provides a non-transitory computer-readable storage medium, where the computer-readable storage medium stores computer executable instructions, and the computer executable instructions, when executed by a processor, implement the foregoing method according to the embodiment of this application.

An embodiment of this application further provides a computer device. The computer device includes:

a memory, configured to store executable instructions; and a processor, configured to perform the foregoing method according to the embodiments of this application when executing the executable instructions stored in the memory.

This embodiment of this application has the following beneficial effects:

The three-dimensional face image feature of the face image and the three-dimensional face template image feature of the face template image are obtained through three-dimensional face modeling. Since the extracted image features are three-dimensional features, a face contour, i.e., a face shape feature, in the face image can be preserved, so as to ensure consistent face contours before and after face replacement. The three-dimensional face image feature and the three-dimensional face template image feature are fused to obtain the three-dimensional fusion feature, so that a face image obtained after the face replacement has a feature of the face image and a feature of the face template image. Face replacement feature extraction is performed on the face image based on the face template image to obtain the initial face replacement feature, and the initial face replacement feature is transformed based on the three-dimensional fusion feature to obtain the target face replacement feature. Since the initial face replacement feature is transformed based on the three-dimensional fusion feature obtained by fusing the three-dimensional face image feature and the three-dimensional face template image feature, the target face replacement feature obtained by transformation can carry a face contour feature and a face identity feature. Then, a face image obtained after the template face in the face template image is replaced with the source face based on the target face replacement feature achieves a more natural and realistic display effect, thereby improving accuracy of face image processing.

DESCRIPTION OF EMBODIMENTS

The technical solutions in the embodiments of this application are clearly and completely described below with reference to the accompanying drawings in the embodiments of this application. However, the described embodiments are merely some rather than all of the embodiments of this application. All other embodiments obtained by a person of ordinary skill in the art based on the embodiments of this application without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

An embodiment of this application provides a face image processing method. The face image processing method may be performed by a face image processing apparatus. The face image processing apparatus may be integrated into a computer device. The computer device may include at least one of a terminal, a server, and the like.

In some embodiments, in order to better implement the face image processing method according to this embodiment of this application, correspondingly, an embodiment of this application further provides a face image processing model training method, so as to perform the face image processing method according to this embodiment of this application by using a face image processing model. The face image processing model training method according to this embodiment of this application may be performed by a face image processing model training apparatus. The face image processing model training apparatus may be integrated into a computer device. The computer device may include at least one of a terminal and a server.

The terminal may be a smartphone, a tablet computer, a notebook computer, a personal computer (PC), smart household, a wearable electronic device, a virtual reality (VR)/an augmented reality (AR) device, an in-vehicle computer, or the like. The server may be an interconnected server or a background server among multiple heterogeneous systems, or may be an independent physical server, or may be a server cluster comprising a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, big data, and an artificial intelligence platform.

Figure 1:
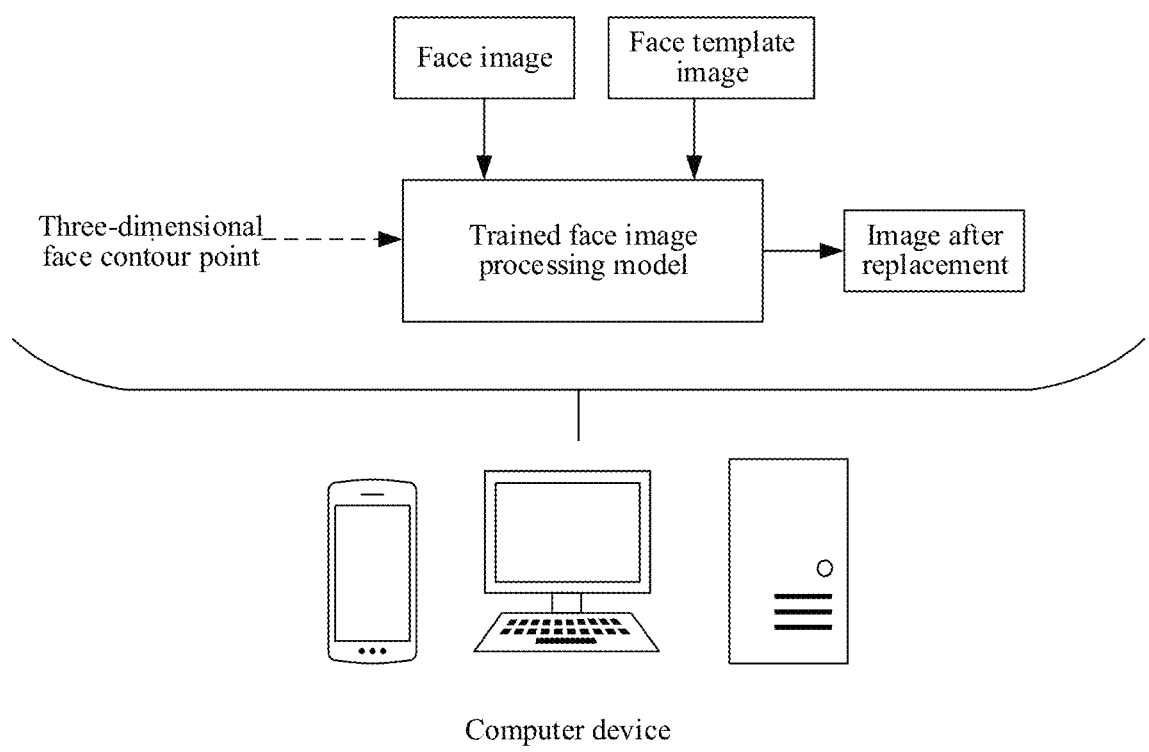
FIG. 1 is a schematic diagram of a scenario of a method according to an embodiment of this application.

In some embodiments, as depicted in FIG. 1, a face image processing apparatus may be integrated into a computer device such as a terminal or a server, so as to implement a face image processing method according to an embodiment of this application. For example, the computer device may acquire a face image of a source face and a face template image of a template face; perform three-dimensional face modeling on the face image and the face template image to obtain a three-dimensional face image feature of the face image and a three-dimensional face template image feature of the face template image; fuse the three-dimensional face image feature and the three-dimensional face template image feature to obtain a three-dimensional fusion feature; perform face replacement feature extraction on the face image based on the face template image to obtain an initial face replacement feature; transform the initial face replacement feature based on the three-dimensional fusion feature to obtain a target face replacement feature; and replace the template face in the face template image with the source face based on the target face replacement feature to obtain a target face image after the replacement.

A face image processing model training apparatus may be integrated into a computer device such as a terminal or a server, so as to implement a face image processing model training method according to an embodiment of this application. For example, the computer device may acquire a training image sample group, the training image sample group including a face image sample, a face template image sample, and a face reference image sample; replace, by using a face image processing model, a template face in the face template image sample with a source face in the face image sample to obtain a predicted face image; perform three-dimensional face contour point detection on the predicted face image to obtain three-dimensional face contour points of the predicted face image, and perform three-dimensional face contour point detection on the face reference image sample to obtain three-dimensional face contour points of the face reference image sample; acquire differences between the three-dimensional face contour points of the predicted face image and the three-dimensional face contour points of the face reference image sample to obtain a face contour loss between the predicted face image and the face reference image sample; and update a model parameter of the face image processing model based on the face contour loss. That is, the face image processing model is adjusted to obtain a trained face image processing model.

A process of face image processing may be regarded as replacing a face of an object in the face template image with a face of an object in a source image, and may be understood as changing a face for a face object in the face template image. For example, the face is a human face, and the so-called "changing a face" means changing identity of the human face in the face template image into a human in the source image, and at the same time, keeping at least one of elements of the human face in the face template image such as a pose, an expression, makeup, and background, unchanged. The face image processing method according to this embodiment of this application is generally applicable to scenarios such as certificate photo production, film and television portrait production, game character design, virtual images, and privacy protection.

A process of training the face image processing model may be regarded as inputting a plurality of training image sample groups into the face image processing model, so that the face image processing model can constantly learn the plurality of training image sample groups and constantly summarize rules, and finally can accurately replace the template face in the face template image with the source face of the face image.

The image processing method and the face image processing model training method according to the embodiments of this application relate to computer vision technologies in the field of artificial intelligence. That is, in the embodiments of this application, the object in the face template image can be replaced with a source object in the face image by using the computer vision technologies of artificial intelligence, to obtain a target face image after the replacement.

This embodiment of this application will be described from the perspective of a face image processing apparatus. The face image processing apparatus may be integrated into a computer device. The computer device may be a server, or may be a device such as a terminal.

Figure 2:
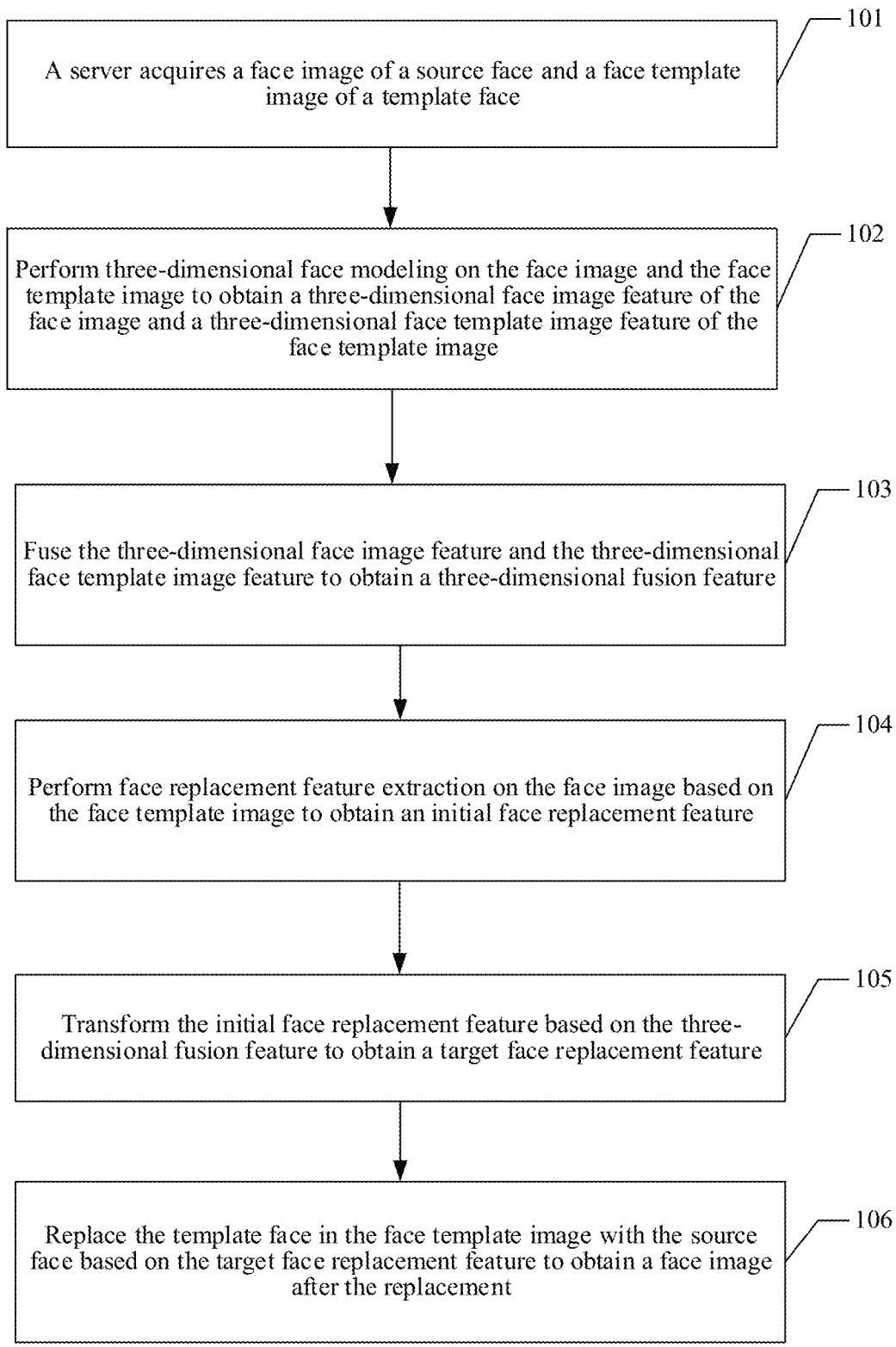
FIG. 2 is a schematic flowchart of a face image processing method according to an embodiment of this application.

In some embodiments, the face image processing method according to this embodiment of this application may be implemented by the terminal or the server alone or by the terminal and the server together. For example, the face image processing method is implemented by the server alone. As depicted in FIG. 2, a face image processing method is provided. The method includes the following steps:

101: A server acquires a face image of a source face and a face template image of a template face.

The face image includes a source object. The so-called "source object" may be an object included in the face image. For example, if the face image is a human face image, the source object may be a human corresponding to the human face image. The source face is a face object source that provides face object replacement, and corresponds to the template face. The template face includes other elements such as a to-be-replaced face object and a to-be-retained face background.

Figure 3:
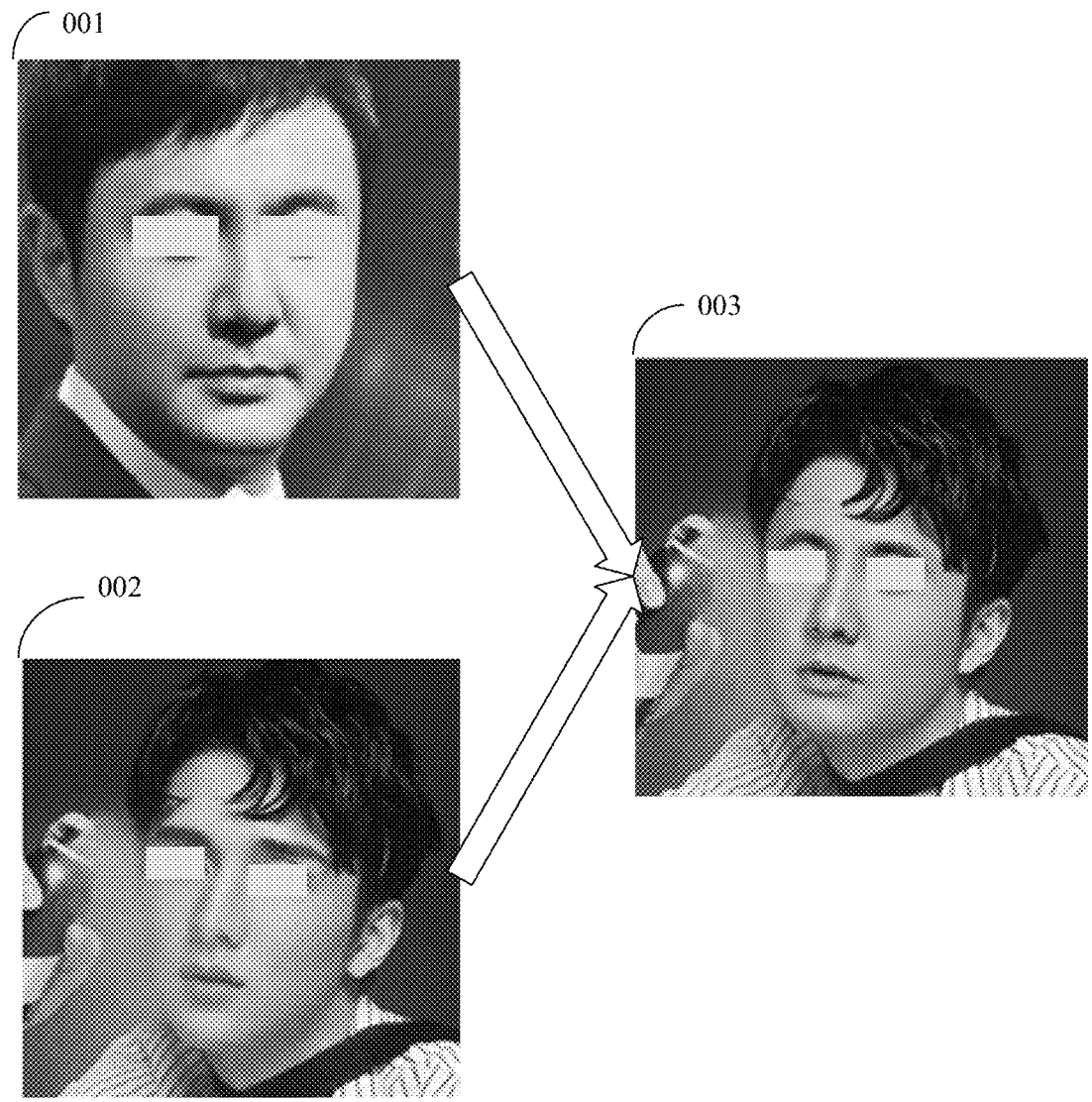
FIG. 3 is a schematic diagram of a scenario of a face image processing method according to an embodiment of this application.

For example, as shown in FIG. 3, 001 in FIG. 3 may be the face image, 002 in FIG. 3 may be the face template image, and 003 in the figure may be a face image after the replacement. As can be seen from FIG. 3, a face feature of the face image 001 is retained in the face image after the replacement 003, and elements such as a pose, an expression, makeup, and background of the face template image 002 are also retained.

The face image and the face template image may be acquired in a variety of manners. For example, the face image and the face template image may be directly acquired, or the face image and the face template image may be indirectly acquired when quantities of the face image and the face template image are larger or memory is larger, which may be specifically as follows:

(1) Directly Acquire the Face Image and the Face Template Image

For example, an original face image uploaded by a user and image processing information corresponding to the original face image may be directly received, and the face image of the source face and the face template image of the template face are selected from the original face image according to the image processing information, or a face image pair is acquired from an image database or a network, one face image is randomly selected from the face image pair as the face image of the source face, and the other face image in the face image pair is used as the face template image.

(2) Indirectly Acquire the Face Image and the Face Template Image

For example, an image processing request transmitted by a terminal may be received. The image processing request carries a storage address and the image processing information of the original face image. The original face image is acquired from the memory, a cache, or a third-party database, and the face image of the source face and the face template image of the template face are selected from the original face image according to the image processing information.

In some embodiments, after the original face image is successfully acquired, prompt information may be transmitted to the terminal to prompt the terminal that the original face image is successfully acquired.

In some embodiments, after the original face image is successfully acquired, the original face image may be preprocessed, so as to obtain the face image and the face template image. The preprocessing may be performed in a variety of manners. For example, a size of the original face image may be adjusted to a preset size, or face objects in the original face image may be aligned to a unified position by face key point registration.

102: Perform three-dimensional face modeling on the face image and the face template image to obtain a three-dimensional face image feature of the face image and a three-dimensional face template image feature of the face template image.

The three-dimensional face image feature may include information indicating characteristics of the face image in a three-dimensional space. For example, information such as facial features, a face contour, texture, an angle, and illumination of the source face in the face image may be indicated through the three-dimensional face image feature.

The three-dimensional face template image feature may include features indicating characteristics of the face template image in the three-dimensional space. For example, the three-dimensional face template image feature may include: at least one of an expression feature, a texture feature, an angle feature, and an illumination feature of the template face in the face template image.

In some embodiments, the three-dimensional face image feature may include a plurality of (i.e., at least two) features. The features jointly constitute the three-dimensional face image feature. For example, the three-dimensional face image feature may include a source face identity feature, a face contour feature, a source face expression feature, a source face texture feature, a source face angle feature, a source face illumination feature, and so on.

The source face identity feature includes features that can indicate identity of the source face in the three-dimensional face image. For example, the source face of the face image can be distinguished from source faces of other face images through the identity feature. That is, when the face image includes a face of a target object, the identity feature can identify the target object, and the source face of the face image can be known through the identity feature.

The source face expression feature includes features that can indicate expressions of the source face in the face image. The source face texture feature includes features that can indicate texture of the face image. The source face angle feature includes features that can indicate an angle of the source face in the face image. That is, the source face angle feature can indicate orientation of the source face in the face image. For example, whether the source face is looking left or right, or is facing straight ahead can be known through the angle feature. The source face illumination feature includes features that can indicate brightness of the face image.

In some embodiments, the three-dimensional face template image feature may also include a plurality of features. The features jointly constitute the three-dimensional face template image feature. For example, the three-dimensional face template image feature may include a template face identity feature, a template face expression feature, a template face texture feature, a template face angle feature, a template face illumination feature, and so on.

In some embodiments, when the three-dimensional face template image feature includes the template face identity feature, the template face expression feature, the template face texture feature, the template face angle feature, and the template face illumination feature, information such as an expression, texture, an angle, and illumination of the template face can be retained and the identity in the template face can be replaced with the identity of the source face when the template face in the face template image is replaced with the source face of the face image. For example, as shown in FIG. 3, assuming that a character in the face image 001 is Zhang San and a character in the face template image 002 is Li Si, only Li Si is replaced with Zhang San in face replacement, but Li Si's information such as an expression, texture, an angle, and illumination in the face template image 002 are still retained.

In some embodiments, the three-dimensional face image feature and the three-dimensional face template image feature may be expressed in various forms. For example, the three-dimensional face image feature and the three-dimensional face template image feature may be vectors. In another example, the three-dimensional face image feature and the three-dimensional face template image feature may be matrices, and the like.

In some embodiments, three-dimensional face modeling may be performed on the face image and the face template image in a variety of manners to obtain the three-dimensional face image feature of the face image and the three-dimensional face template image feature of the face template image.

For example, three-dimensional face modeling may be performed on the face image and the face template image respectively by using a three-dimensional face modeling model, so as to obtain the three-dimensional face image feature of the face image and the three-dimensional face template image feature of the face template image.

The three-dimensional face modeling model may include a model that performs three-dimensional modeling on an image and acquires a three-dimensional feature of the image.

For example, the three-dimensional face modeling model may include at least one of a convolutional neural networks (CNN), a deep residual network (ResNet), a three-dimensional face morphable model (3DMM), and the like.

In another example, the face image and the face template image may be regressed respectively by using the 3DMM, so as to perform face modeling on the source face and the template face and acquire a plurality of source face features of the face image and a plurality of template face features of the face template image from the 3DMM. Then, the plurality of source face features may be fused to obtain the three-dimensional face image feature, and the plurality of template face features may be fused to obtain the three-dimensional face template image feature.

103: Fuse the three-dimensional face image feature and the three-dimensional face template image feature to obtain a three-dimensional fusion feature.

In practical applications, the three-dimensional face image feature and the three-dimensional face template image feature are fused to obtain the three-dimensional fusion feature, so that a face image after the replacement has a feature of the face image and a feature of the face template image.

In some embodiments, in order that information such as an expression, texture, an angle, and illumination of a template face 5 can be retained and identity in the template face can be replaced with identity of the source face when the template face in the face template image is replaced with the source face of the face image, the source face identity feature and a template face image feature may be fused in the following manner to obtain the three-dimensional fusion feature:

extracting a source face identity feature of the face image from the three-dimensional face image feature;

extracting a template face image feature of the face template image from the three-dimensional face template image feature; and fusing the source face identity feature and the template face image feature to obtain the three-dimensional fusion feature.

The source face identity feature includes features that can represent identity of the source face in the three-dimensional face image. The template face image feature may include a template face expression feature, a template face texture feature, a template face angle feature, and a template face illumination feature.

In some embodiments, the source face identity feature and the template face image feature may be fused in a variety of manners to obtain the three-dimensional fusion feature.

For example, the source face identity feature and the template face image feature may be spliced. In another example, the source face identity feature and the template face image feature may be added. In another example, the source face identity feature and the template face image feature may be weighted and summed, and so on.

In some embodiments, the source face identity feature and the template face image feature may be added to obtain the three-dimensional fusion feature.

For example, the source face identity feature, the template face expression feature, the template face texture feature, the template face angle feature, and the template face illumination feature may be added to obtain the three-dimensional fusion feature. An addition process may be shown by the following formula:

$$gt_{3d_{feature}} = source_{3d_{feature_{id}}} + target_{3d_{feature_{expression}}} + target_{3d_{feature_{texture}}} + target_{3d_{feature_{angles}}} + target_{3d_{feature_{gamma}}}$$

where the symbol $gt_{3d_{feature}}$ may denote the source face identity feature, the symbol $$target_{3d_{feature_{expression}}}$$

may denote the template face expression feature, the symbol $$target_{3d_{feature_{texture}}}$$

may denote the template face texture feature, and the symbol $$target_{3d_{feature_{angles}}}$$

may denote the template face angle feature, and the symbol $$target_{3d_{feature_{gamma}}}$$

may denote $$target_{3d_{feature_{gamma}}}.$$

104: Perform face replacement feature extraction on the face image based on the face template image to obtain an initial face replacement feature.

In some embodiments, performing three-dimensional face modeling on the face image and the face template image is equivalent to processing the face image and the face template image from the perspective of a three-dimensional space. Performing face replacement feature extraction on the face image based on the face template image is equivalent to processing the face template image and the face image from the perspective of a two-dimensional space.

More features of the face image and the face template image may be acquired respectively from the perspective of the two-dimensional space and the three-dimensional space, so that more information is available for face replacement processing, and accuracy of the face image processing method is improved.

The initial face replacement feature may include features that form a mapping relationship between the face image and the face template image.

In some embodiments, face replacement feature extraction may be performed on the face image in a variety of manners based on the face template image to obtain the initial face replacement feature.

For example, face replacement feature extraction may be performed, by using a machine learning network such as a CNN or a generative adversarial networks (GAN), on the face image based on the face template image to obtain the initial face replacement feature.

As a method of deep learning, the GAN is different from ordinary neural networks. The GAN is formed by two main networks, of which one is a generator or generator network, and the other is a discriminator or discriminator network. A core logic of the GAN is that the generator and the discriminator play against each other and contest with each other.

The generator may be a neural network, with a function of generating content. For example, the generator may generate a picture, a piece of text, a video, and the like.

The discriminator may also be a neural network, with a function of discriminating content inputted into the discriminator. For example, taking the picture as an example, a goal of the discriminator is to determine whether the picture inputted into the discriminator is the picture generated by the generator or a real picture.

The generator may include a decoder and an encoder. A function of the encoder is to compress real data and compress high-dimensional data into low-dimensional data. A function of the decoder is to restore compressed data to raw data.

In another example, face replacement feature extraction may be performed, by using a machine learning network formed by a plurality of CNNs, on the face image based on the face template image to obtain the initial face replacement feature.

For example, the face image and the face template image may be inputted into the machine learning network formed by a plurality of CNNs. Then, the machine learning network may constantly reduce resolution of the face image and resolution of the face template image, and encode the face image and the face template image into the initial face replacement feature in a hidden space.

The hidden space includes a space formed by a structure of the machine learning network. For example, the machine learning network includes an input layer, an output layer, and several convolutional layers between the input layer and the output layer, so the several convolutional layers may constitute the hidden space.

In some embodiments, face replacement feature extraction may be performed on the face image in the following manner based on the face template image to obtain the initial face replacement feature:

encoding the face template image to obtain a first encoding feature of the face template image;

encoding the face image to obtain a second encoding feature of the face image; and adjusting the first encoding feature based on the second encoding feature to obtain the initial face replacement feature.

105: Transform the initial face replacement feature based on the three-dimensional fusion feature to obtain a target face replacement feature.

In some embodiments, the three-dimensional fusion feature may indicate a relationship between the face image and the face template image in the three-dimensional space, while the initial face replacement feature may indicate a relationship between the face image and the face template image in the two-dimensional space. In order to improve accuracy of face replacement, the initial face replacement feature may be transformed based on the three-dimensional fusion feature to obtain the target face replacement feature. For example, the three-dimensional fusion feature and the initial face replacement feature may be mapped to a same space to obtain a target face replacement feature.

In some embodiments, the initial face replacement feature may be transformed in a variety of manners based on the three-dimensional fusion feature to obtain the target face replacement feature.

For example, the initial face replacement feature may be transformed by using a norm based on the three-dimensional fusion feature to obtain the target face replacement feature. For example, the initial face replacement feature may be transformed by using an L1 norm or an L2 norm based on the three-dimensional fusion feature to obtain the target face replacement feature.

In some embodiments, the initial face replacement feature may also be transformed in the following manner based on the three-dimensional fusion feature to obtain the target face replacement feature:

performing first logic operation on the three-dimensional fusion feature to obtain a three-dimensional face image feature after the first logic operation, and performing second logic operation on the initial face replacement feature to obtain a face replacement feature after the second logic operation;

performing third logic operation on the initial face replacement feature and the face replacement feature after the second logic operation to obtain a face replacement feature after the third logic operation; and performing fourth logic operation on the face replacement feature after the third logic operation and the three-dimensional face image feature after the first logic operation to obtain the target face replacement feature.

The first logic operation and the second logic operation may include calculating a mean of data, a variance of the data, a standard deviation of the data, a covariance of the data, and the like.

The third logic operation and the fourth logic operation may include processing the data by addition, subtraction, multiplication, division, or the like. For example, the third logic operation and the fourth logic operation may include division of the data. In another example, the third logic operation and the fourth logic operation may include subtraction of the data, and so on.

In some embodiments, the initial face replacement feature may be transformed by adaptive instance normalization (AdaIN) based on the three-dimensional fusion feature to obtain the target face replacement feature.

AdaIN is a method that can align a mean and a variance of the three-dimensional fusion feature to a mean and a variance of the initial face replacement feature, so as to realize image feature transformation. For example, through AdaIN, the mean and the variance of the three-dimensional fusion feature may be aligned to the mean and the variance of the initial face replacement feature, so as to realize feature replacement.

The initial face replacement feature may be transformed by AdaIN based on the three-dimensional fusion feature to obtain the target face replacement feature as follows:

$$AdaIN(x, y) = \sigma(y)\left(\frac{x - \mu(x)}{\sigma(x)}\right) + \mu(y)$$

where x may denote the initial face replacement feature, and y may denote the three-dimensional fusion feature. $\sigma(\ )$ and $\mu(\ )$ may denote a mean and a standard deviation respectively. AdaIN(x, y) may denote the target face replacement feature.

In some embodiments, logic operation (such as addition, subtraction, multiplication, or division) may be performed on the three-dimensional fusion feature according to AdaIN to obtain a three-dimensional face image feature after the logic operation, and logic operation may be performed on the initial face replacement feature to obtain a face replacement feature after the logic operation. For example, a mean and a standard deviation of the three-dimensional fusion feature and a mean and a standard deviation of the initial face replacement feature may be calculated according to AdaIN.

Herein, the three-dimensional fusion feature includes at least two sub three-dimensional fusion features (for example, the sub three-dimensional fusion features may be a three-dimensional face identity feature, a three-dimensional face expression feature, a three-dimensional face texture feature, a three-dimensional face angle feature, and a face illumination feature). Each of the sub three-dimensional fusion features corresponds to a feature dimension. Correspondingly, first logic operation may be performed on the three-dimensional fusion feature in the following manner to obtain the three-dimensional face image feature after the first logic operation: determining a standard deviation of the at least two sub three-dimensional fusion features, and taking the standard deviation as the three-dimensional face image feature after the first logic operation.

Then, logic operation may be performed on the initial face replacement feature and the face replacement feature after the second logic operation according to AdaIN to obtain the face replacement feature after the logic operation. For example, the initial face replacement feature and the standard deviation of the initial face replacement feature may be subtracted and then divided to obtain the face replacement feature after the operation.

Then, logic operation may be performed on the face replacement feature after the operation and a three-dimensional face image feature after statistics according to AdaIN to obtain the target face replacement feature. For example, means of a template replacement feature after the operation and the three-dimensional face image feature after statistics may be multiplied and then added, so as to obtain the target face replacement feature.

106: Replace the template face in the face template image with the source face based on the target face replacement feature to obtain a target face image after the replacement.

In some embodiments, in order to improve a degree of similarity between a face in the face image after the replacement and an original face to improve accuracy of the face image processing method, feature extraction may be performed on the face image to obtain a face feature of the face image, and then the template face in the face template image is replaced with the source face based on the target face replacement feature and the face feature of the face image to obtain the face image after the replacement.

Performing feature extraction on the face image may include representing face information through some data. Such data may indicate the face feature of the face image.

In some embodiments, the face feature in this embodiment of this application may be a geometric feature of the source face or a representational feature of the source face. The geometric feature may refer to a geometric relationship between face features such as eyes, a nose, and a mouth, for example, distances, areas, angles, and the like. The representational feature of the source face is a global or local feature extracted through some algorithms by using gray-scale information of the face image.

In some embodiments, feature extraction may be performed on the face image in a variety of manners to obtain the face feature of the face image.

For example, when the face feature is the geometric feature of the source face, a position location of the face image may be generated to obtain position information of face part feature points in the face image. Then, a space difference between the position information of the face part feature points may be calculated respectively, and the space difference is used as the face feature.

In another example, when the face feature is the representational feature of the source face, convolution extraction may be performed on the face image by using a convolution kernel to obtain a convolution result of the face image, and then the convolution result of the face image is regressed to obtain the face image.

In another example, feature extraction may also be performed on the face image by using a machine learning network that can extract the face feature. For example, feature extraction may be performed on the face image by using a CNN, a deep neural networks (DNN) or the like, to obtain the face feature of the face image.

In some embodiments, the template face in the face template image may be replaced, by using a trained face image processing model, with the source face based on the target face replacement feature and the face feature of the face image to obtain the face image after the replacement. For example, the template face in the face template image is replaced, by using a GAN, with the source face based on the target face replacement feature and the face feature of the face image to obtain the face image after the replacement.

In some embodiments, a model structure of the trained face image processing model may include a three-dimensional face modeling network, a face feature extraction network, and a GAN. The GAN may include a generator and a discriminator. The generator includes an encoder and a decoder.

The three-dimensional face modeling network may be a ResNet. The three-dimensional face modeling network may be configured to perform three-dimensional face modeling on the face image and the face template image to obtain a three-dimensional face image feature of the face image and a three-dimensional face template image feature of the face template image. In addition, the three-dimensional face modeling network may also be configured to fuse the three-dimensional face image feature and the three-dimensional face template image feature to obtain a three-dimensional fusion feature.

The face feature extraction network may be a CNN. The face feature extraction network may be configured to perform feature extraction on the face image to obtain a face feature.

The encoder may perform face replacement feature extraction on the face image based on the face template image to obtain an initial face replacement feature.

The decoder may replace the template face in the face template image with the source face based on the target face replacement feature and the face feature of the face image to obtain a target face image after the replacement. For example, the target face replacement feature and the face feature of the face image may be decoded by using the decoder, to obtain a face replacement feature after the decoding and a face image after the decoding. Then, the face replacement feature after the decoding and the face image after the decoding are fused to obtain a face feature after the fusion. Then, the face feature after the fusion may be mapped to a preset probability distribution space to obtain probability distribution of the face feature after the fusion. Moreover, the face image after the replacement is generated based on the probability distribution of the face feature after the fusion.

The preset probability distribution space is a mathematical space in the decoder. The preset probability distribution space is a space constantly formed in a process of training the face image processing model, which may generate content consistent with a training purpose according to features.

In this embodiment of this application, the face image processing model is trained by using three-dimensional face contour points, so that a face contour of the source face in the face image can be retained in a face image after the replacement obtained through the trained face image processing model, and a face image processing effect is more realistic, thereby improving accuracy of face image processing.

Figure 4:
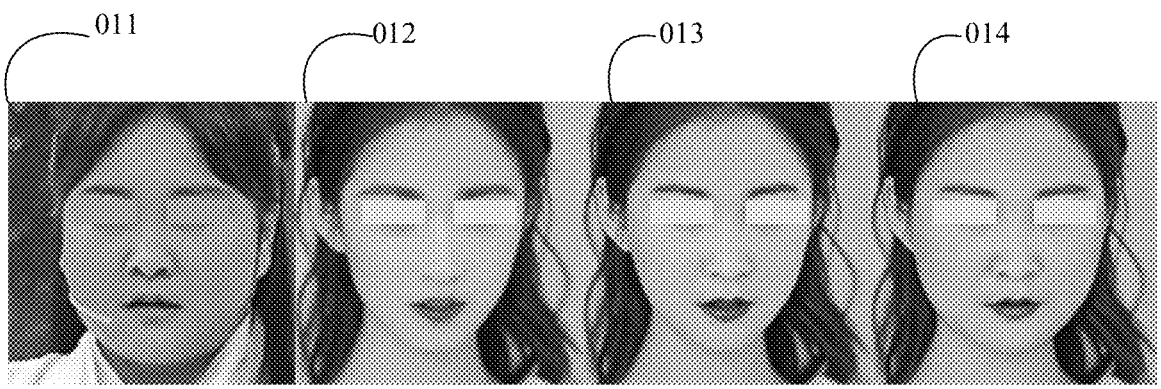
FIG. 4 is a schematic diagram of another scenario of a face image processing method according to an embodiment of this application.

For example, as depicted in FIG. 4, 011 in FIG. 4 may be the face image, 012 in FIG. 4 may be the face template image, 013 in FIG. 4 may be the face image after the replacement obtained by using a related technology, and 014 in FIG. 4 may be the face image after the replacement obtained by using the trained face image processing model. Upon comparison between 013 and 014 in FIG. 4, it is clear that the face in 014 is more similar to the face in 011.

An embodiment of this application provides a face image processing method. The face image processing method includes: acquiring a face image of a source face and a face template image of a template face; performing three-dimensional face modeling on the face image and the face template image to obtain a three-dimensional face image feature of the face image and a three-dimensional face template image feature of the face template image; fusing the three-dimensional face image feature and the three-dimensional face template image feature to obtain a three-dimensional fusion feature; performing face replacement feature extraction on the face image based on the face template image to obtain an initial face replacement feature; transforming the initial face replacement feature based on the three-dimensional fusion feature to obtain a target face replacement feature; and replacing the template face in the face template image with the source face based on the target face replacement feature and the face feature of the face image to obtain a target face image after the replacement. In this embodiment of this application, more features of the face image and the face template image may be acquired respectively in combination with the three-dimensional fusion feature and a two-dimensional face feature from the perspective of the two-dimensional space and the three-dimensional space, so that more information is available for face replacement processing, and accuracy of the face image processing method is improved.

An embodiment of this application further correspondingly provides a face image processing model training method. Then, this embodiment of this application will be described from the perspective of a face image processing model training apparatus. The face image processing model training apparatus may be integrated into a computer device. The computer device may be a server, or may be a device such as a terminal.

Figure 5:
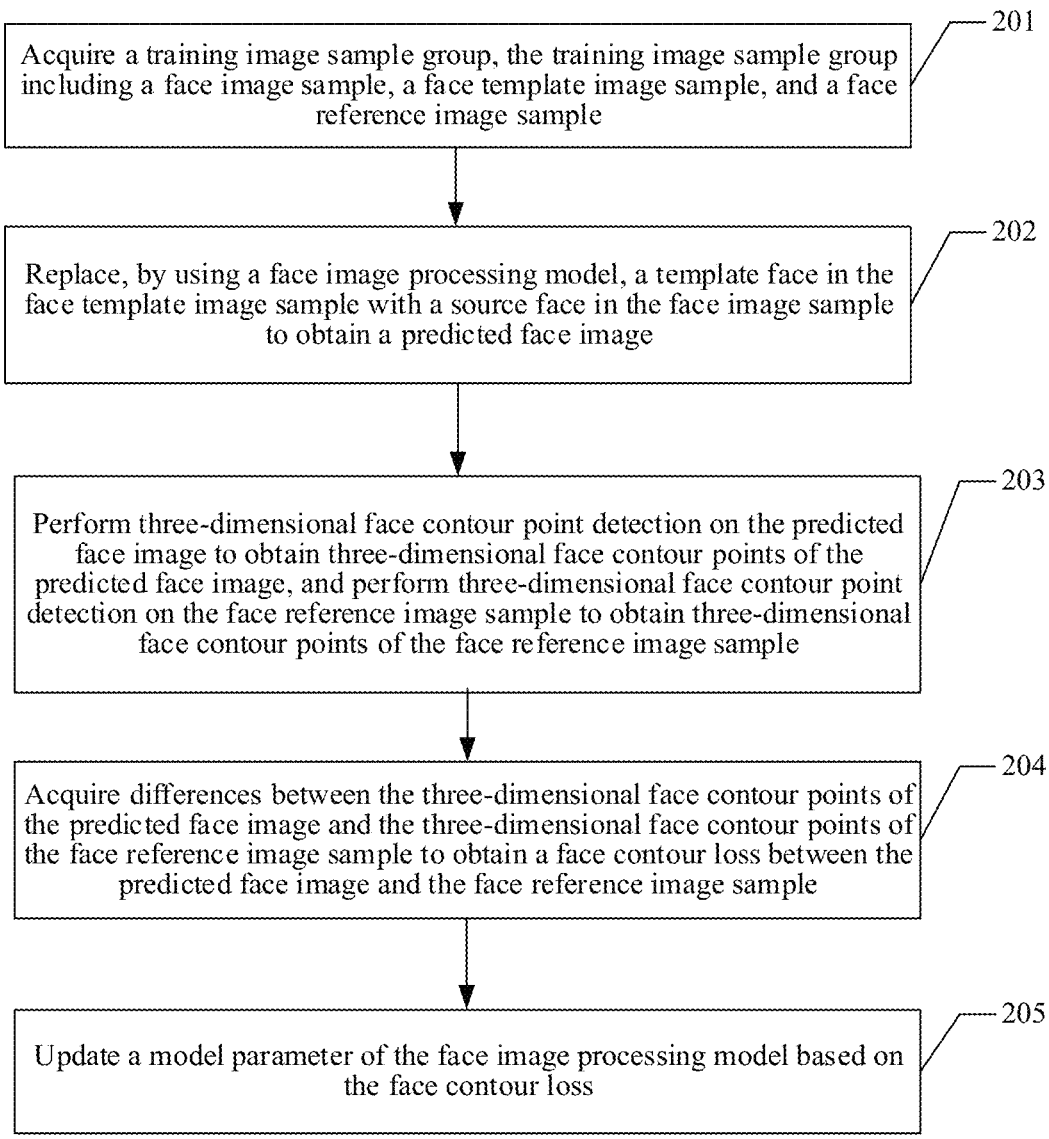
FIG. 5 is a schematic flowchart of a face image processing model training method according to an embodiment of this application.

In some embodiments, the face image processing model training method according to this embodiment of this application may be implemented by the terminal or the server alone or by the terminal and the server together. For example, the face image processing model training method is implemented by the server alone. As depicted in FIG. 5, a face image processing model training method is provided, and includes the following steps:

201: Acquire a training image sample group, the training image sample group including a face image sample, a face template image sample, and a face reference image sample.

The training image sample group includes data used for training a preset face image processing model.

In some embodiments, the training image sample group includes the face image sample, the face template image sample, and the face reference image sample.

Figure 6:
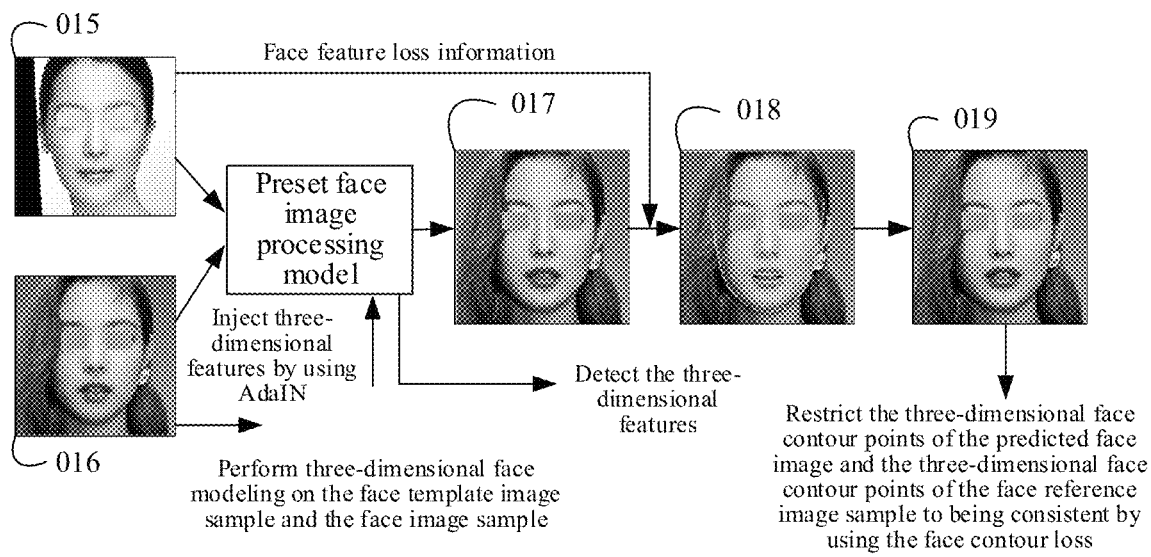
FIG. 6 is a schematic diagram of a scenario of a face image processing model training method according to an embodiment of this application.

The face image sample may correspond to a face image. The face template image sample may correspond to a face template image. The face image sample also includes a source face, while the face template image sample includes a template face. For example, as shown in FIG. 6, 015 in FIG. 6 may be the face image sample, and 016 may be the face template image sample.

The face reference image sample includes a reference image obtained by synthesizing the face image and the face template image sample. The face reference image sample includes not only information of the source face in the face image, but also image information such as texture, an angle, illumination, and an expression of the template face in the face template image sample. The face reference image sample may be equivalent to the face image after the replacement, and a difference is that the face reference image sample is artificially synthesized. In addition, the face reference image sample is equivalent to a training purpose of a developer, with a function of providing a reference for the image processing model in the process of training the image processing model, so that the trained image processing model can generate content meeting a requirement.

In some embodiments, the training image sample group may be acquired in a variety of manners. For example, the training image sample group may be directly acquired from an open source website. In another example, the training image sample group may be obtained by collecting the face image sample and the face template image sample and synthesizing the face image sample and the face template image sample into the face reference image sample.

202: Replace, by using a face image processing model, a template face in the face template image sample with a source face in the face image sample to obtain a predicted face image.

The predicted face image may include an image obtained after the template face in the face template image sample is replaced with the source face in the face image sample. For example, as shown in FIG. 6, 017 in FIG. 6 may be the predicted face image.

The face image processing model includes a face image processing model ready for training.

A structure of the preset face image processing model is the same as that of the trained face image processing model in step 106, but a predicted face image generated by the face image processing model ready for training does not meet the training purpose.

In some embodiments, the replacing, by using a face image processing model, a template face in the face template image sample with a source face in the face image sample to obtain a predicted face image includes:

performing, by using the face image processing model, three-dimensional face modeling on the face image sample and the face template image sample to obtain a three-dimensional face image sample feature of the face image sample and a three-dimensional face template image sample feature of the face template image sample;

fusing, by using the face image processing model, the three-dimensional face image sample feature and the three-dimensional face template image sample feature to obtain a three-dimensional face image sample feature after the fusion;

performing, by using the face image processing model, face replacement feature extraction on the face image sample based on the face template image sample to obtain an initial face replacement sample feature;

transforming, by using the face image processing model, the initial face replacement sample feature based on the three-dimensional face image sample feature after the fusion to obtain a target face replacement sample feature; and replacing, by using the face image processing model, the template face in the face template image sample with the source face of the face image sample based on the target face replacement sample feature and the face feature of the face image sample to obtain the predicted face image.

For example, as shown in FIG. 6, three-dimensional face modeling may be performed on the face template image sample and the face image sample to obtain the three-dimensional face image sample feature of the face image sample and the three-dimensional face template image sample feature of the face template image sample. Then, the face image processing model may fuse the three-dimensional face image sample feature and the three-dimensional face template image sample feature to obtain the three-dimensional face image sample feature after the fusion. In addition, the face image processing model performs face replacement feature extraction on the face image sample based on the face template image sample to obtain the initial face replacement sample feature. Then, the preset face image processing model may inject the three-dimensional face image sample feature after the fusion into the initial face replacement sample feature by using AdaIN. Three-dimensional features in FIG. 6 may include the three-dimensional face image sample feature after the fusion.

203: Perform three-dimensional face contour point detection on the predicted face image to obtain three-dimensional face contour points of the predicted face image, and perform three-dimensional face contour point detection on the face reference image sample to obtain three-dimensional face contour points of the face reference image sample.

The three-dimensional face contour points include information points that describe a face contour in an image from the perspective of the three-dimensional space. For example, contour information of a predicted face in the predicted face image may be known through the three-dimensional face contour points of the predicted face image. In another example, contour information of a face in the face reference image sample may be known through the three-dimensional face contour points of the face reference image sample.

In some embodiments, in order to improve accuracy of face image processing, in this embodiment of this application, the face image processing model may be trained by using the three-dimensional face contour points. Therefore, three-dimensional face contour point detection may be performed on the predicted face image to obtain the three-dimensional face contour points of the predicted face image, and three-dimensional face contour point detection on the face reference image sample may be performed to obtain the three-dimensional face contour points of the face reference image sample.

For example, the predicted face image may be projected into the three-dimensional space, and the three-dimensional space is searched for the three-dimensional face contour points of the predicted face image.

In another example, three-dimensional face modeling may be performed on the predicted face image to obtain a three-dimensional predicted face image feature of the predicted face image. Three-dimensional key point projection is performed on the three-dimensional predicted face image feature to obtain three-dimensional face key points of the predicted face image. The three-dimensional face contour points are selected from the three-dimensional face key points based on the three-dimensional face key points.

The three-dimensional predicted face image feature may indicate characteristics of the predicted face image in the three-dimensional space. For example, the three-dimensional predicted face image feature may indicate information such as facial features, a face contour, texture, an angle, and illumination of a predicted face in the predicted face image.

The three-dimensional predicted face image feature may include a plurality of features. The features jointly constitute the three-dimensional predicted face image feature. For example, the three-dimensional predicted face image feature may include a predicted face identity feature, a predicted face expression feature, a predicted face texture feature, a predicted face angle feature, a predicted face illumination feature, and so on.

The three-dimensional face key points include a plurality of key points with information of the predicted face, for example, all key points used for indicating features of the predicted face.

In some embodiments, as shown in FIG. 6, three-dimensional face modeling may be performed on the predicted face image to obtain the three-dimensional predicted face image feature of the predicted face image as 018 in FIG. 6. Then, three-dimensional key point projection is performed on the three-dimensional predicted face image feature to obtain the three-dimensional face key points of the predicted face image. Then, the three-dimensional face contour points may be selected from the three-dimensional face key points based on the three-dimensional face key points as 019 in FIG. 6.

In some embodiments, three-dimensional key point projection may be performed, by using a projection function, on the three-dimensional predicted face image feature to obtain the three-dimensional face key points of the predicted face image. For example, three-dimensional key point projection is performed on the three-dimensional predicted face image feature according to the following formula to obtain the three-dimensional face key points of the predicted face image:

$$\text{result\_3d\_points} = \text{reconstruction\_without\_tex}(\text{result\_3d\_feature})$$

where result\_3d\_points may be the three-dimensional face key points; result\_3d\_feature may be the three-dimensional predicted face image feature; and reconstruction\_without\_tex( ) may be the projection function.

The projection function may be a variety of types of functions. For example, the projection function may be glOrtho( ), glFrustum( ), gluPerspective( ), or the like in an open graphics library (OpenGL).

In some embodiments, the three-dimensional face key points of the predicted face image may be obtained based on the predicted face identity feature and the predicted face expression feature. For example, the performing three-dimensional key point projection on the three-dimensional predicted face image feature to obtain three-dimensional face key points of the predicted face image includes:

extracting a predicted face identity feature and a predicted face expression feature of the predicted face image from the three-dimensional predicted face image feature; and performing, by using preset transfer parameters, three-dimensional key point projection on the predicted face identity feature and the predicted face expression feature to obtain the three-dimensional face key points of the predicted face image.

The preset transfer parameters include preset parameters that can realize information transfer.

In some embodiments, three-dimensional key point projection may be performed on the predicted face identity feature and the predicted face expression feature according to the following formula to obtain the three-dimensional face key points of the predicted face image:

$$\text{result\_3d\_points} = \text{idBase} * \text{id\_coeff} + \text{exBase} * \text{ex\_coeff} + \text{meanshape}$$

where id_coeff may be the predicted face identity feature, ex_coeff may be the predicted face expression feature, and idBase, exBase and meanshape may be the preset transfer parameters.

In some embodiments, after the three-dimensional face key points are obtained, the three-dimensional face contour points may be selected from the three-dimensional face key points based on the three-dimensional face key points.

For example, position information of the three-dimensional face key points may be acquired, and then the three-dimensional face contour points are selected from the three-dimensional face key points based on the position information of the three-dimensional face key points. For example, the three-dimensional face key points whose position information is on edges may be determined as the three-dimensional face contour points.

In another example, the three-dimensional face contour points may be selected according to an output order of the three-dimensional face key points. In some embodiments, the output order of the three-dimensional face key points is specified according to a preset setting. For example, 68 three-dimensional face key points are provided, of which the first 17 three-dimensional face key points are three-dimensional face contour points. Therefore, the three-dimensional face key points whose output order is in the first 17 positions may be determined as the three-dimensional face contour points.

204: Acquire differences between the three-dimensional face contour points of the predicted face image and the three-dimensional face contour points of the face reference image sample to obtain a face contour loss between the predicted face image and the face reference image sample.

In some embodiments, after the three-dimensional face contour points are obtained, the differences between the three-dimensional face contour points of the predicted face image and the three-dimensional face contour points of the face reference image sample may be calculated to obtain the face contour loss between the predicted face image and the face reference image sample.

For example, differences between the three-dimensional face contour points of the predicted face image and the three-dimensional face contour points of the face reference image sample may be calculated to obtain the face contour loss. In another example, cosine similarities between the three-dimensional face contour points of the predicted face image and the three-dimensional face contour points of the face reference image sample may be calculated to obtain the face contour loss.

For example, the differences between the three-dimensional face contour points of the predicted face image and the three-dimensional face contour points of the face reference image sample may be calculated according to the following formula:

$$\text{3d\_point\_loss} = \text{abs}(gt\_3d\_\text{OutlookPoint} - \text{result\_3d\_OutlookPoint})$$

where gt_3d_OutlookPoint may be the three-dimensional face contour points of the face reference image sample, result_3d_OutlookPoint may be the three-dimensional face contour points of the predicted face image, 3d_point_loss may be the face contour loss, and abs( ) may be an absolute value symbol.

In some embodiments, in order to improve performance of the trained face image processing model to enable the trained face image processing model to generate an image meeting a requirement, losses may be calculated from a plurality of other dimensions, and the preset face image processing model is adjusted by using the face contour loss and losses on other dimensions. That is, a model parameter of the face image processing model is updated in combination with the face contour loss and the losses on other dimensions.

For example, as shown in FIG. 6, a face feature loss between the face image sample and the predicted face image may be calculated, so that the preset face image processing model can be adjusted by using other losses in addition to the face contour loss.

For example, differences between the face reference image sample and the predicted face image other than the three-dimensional face contour points are calculated to obtain a first loss between the face reference image sample and the predicted face image. The first loss includes losses other than the face contour loss.

The face feature loss between the face image sample and the predicted face image is calculated, and the first loss and the face feature loss are fused to obtain a second loss. In this way, the model parameter of the face image processing model may be updated based on the second loss.

The losses other than the face contour loss may include losses on other dimensions. For example, the losses on other dimensions may include at least one of a pixel loss, a feature loss, and a discrimination loss.

The pixel loss may include pixel-level losses of the face reference image sample and the predicted face image. The feature loss may include feature-level losses of the face reference image sample and the predicted face image. For example, the feature loss may refer to a difference between a face of the face reference image sample and a predicted face of the predicted face image.

In some embodiments, the face image processing model includes a discriminator. A function of the discriminator is to identify whether the image generated by the generator is a real image. Therefore, the discrimination loss may include information generated after the discriminator discriminates the face reference image sample and the predicted face image.

In some embodiments, when the first loss includes a pixel loss, a feature loss, and a discrimination loss, the calculating differences between the face reference image sample and the predicted face image other than the three-dimensional face contour points to obtain a first loss between the face reference image sample and the predicted face image includes:

calculating a pixel difference between the face reference image sample and the predicted face image to obtain the pixel loss;

calculating a feature difference between the face reference image sample and the predicted face image to obtain the feature loss; and calculating a discrimination difference between the face reference image sample and the predicted face image to obtain the discrimination loss.

In some embodiments, when the pixel difference between the face reference image sample and the predicted face image is calculated, pixel information of the face reference image sample and the predicted face image may be extracted, and then a difference between the pixel information is calculated, so as to obtain the pixel loss.

For example, a value of the face reference image sample on a color channel and a value of the predicted face image on the color channel may be extracted and subtracted, and then an absolution value is calculated, so as to obtain the pixel loss. For example, the pixel loss may be shown by the following formula:

$$Resconstruction_{loss}=abs(result-gt\_img)$$

where result may be the pixel information of the predicted face image, gt_img may be the pixel information of the face reference image sample, and $Resconstruction_{loss}$ may be the pixel loss.

In some embodiments, since feature extraction may be performed on an image in the three-dimensional space and in the two-dimensional space in the face image processing model, the feature loss may include a two-dimensional feature loss and a three-dimensional feature loss. Correspondingly, the calculating a feature difference between the face reference image sample and the predicted face image to obtain the feature loss may include:

calculating a two-dimensional feature difference between the face reference image sample and the predicted face image to obtain the two-dimensional feature loss; and calculating a three-dimensional feature difference between the face reference image sample and the predicted face image to obtain the three-dimensional feature loss; and fusing the two-dimensional feature loss and the three-dimensional feature loss to obtain the feature loss.

The two-dimensional feature difference may include a feature difference between the face reference image sample and the predicted face image in the two-dimensional space. For example, the two-dimensional feature difference may include a difference between an image feature of the face reference image sample and an image feature of the predicted face image.

The three-dimensional feature difference may include a feature difference between the face reference image sample and the predicted face image in the three-dimensional space. For example, the three-dimensional feature difference may include a difference between a three-dimensional face reference image sample feature of the face reference image sample and a three-dimensional predicted face image feature of the predicted face image.

In some embodiments, when the two-dimensional feature difference between the face reference image sample and the predicted face image is calculated, feature extraction may be performed on the face reference image sample and the predicted face image respectively to obtain the image feature of the face reference image sample and the image feature of the predicted face image, and then the difference between the image feature of the face reference image sample and the image feature of the predicted face image is calculated.

For example, feature extraction may be performed on the face reference image sample and the predicted face image by Alexnet to obtain the image feature of the face reference image sample and the image feature of the predicted face image.

The Alexnet is formed by 5 convolutional layers and 3 fully connected layers. The 5 convolutional layers may be configured to perform feature extraction on an image, and are in a relationship of information transfer. For example, the first convolutional layer may extract a feature from the image and then transfer the extracted information to the second convolutional layer. Then, the second convolutional layer may continuously extract a feature from the feature extracted by the first convolutional layer and transfer the extracted feature to the third convolutional layer. By analogy, finally, the fifth convolutional layer may transfer the extracted feature to the fully connected layers.

In some embodiments, the difference between the image feature of the face reference image sample and the image feature of the predicted face image may be calculated in a variety of manners.

For example, the difference between the image feature of the face reference image sample and the image feature of the predicted face image may be calculated by using a learned perceptual image patch similarity (LPIPS) metric. In another example, the two-dimensional feature loss may be calculated by calculating a difference. In another example, the two-dimensional feature loss may be calculated by using a cosine similarity, and so on.

In some embodiments, when feature extraction is performed on the image by the Alexnet, the difference between the image feature of the face reference image sample and the image feature of the predicted face image in each convolutional layer may be calculated.

For example, feature extraction is performed on the face reference image sample by the Alexnet to obtain gt_img_fea1, gt_img_fea2, gt_img_fea3 and gt_img_fea4. gt_img_fea1, gt_img_fea2, gt_img_fea3 and gt_img_fea4 may refer to features of the face reference image sample that are outputted by 4 convolutional layers in the Alexnet.

Similarly, feature extraction may be performed on the predicted face image by the Alexnet to obtain result_fea1, result_fea2, result_fea3 and result_fea4. result_fea1, result_fea2, result_fea3 and result_fea4 may refer to features of the predicted face image that are outputted by 4 convolutional layers in the Alexnet.

Then, the two-dimensional feature loss may be calculated according to the following formula:

$$Two\_loss=abs(result_{fea1}-gt_{img_{fea1}})+abs(result_{fea2}-gt_{img_{fea2}})+abs(result_{fea3}-gt_{img_{fea3}})+abs(result\_fea4-gt\_img\_fea4)$$

where Two_loss may be the two-dimensional feature loss.

In some embodiments, face modeling may be performed on the face reference image sample and the predicted face image to obtain the three-dimensional face reference image sample feature of the face reference image sample and the three-dimensional predicted face image feature of the predicted face image, and then a difference between the three-dimensional face reference image sample feature and the three-dimensional predicted face image feature may be calculated.

In some embodiments, the difference between the three-dimensional face reference image sample feature and the three-dimensional predicted face image feature may also be calculated in a variety of manners. For example, the three-dimensional feature loss may be calculated by using the LPIPS. In another example, the three-dimensional feature loss may be calculated by calculating a difference. In another example, the three-dimensional feature loss may be calculated by using a cosine similarity, and so on.

In some embodiments, the three-dimensional feature loss may be calculated according to the following formula:

$$3d_{feature_{loss}} = abs(gt_{3d_{feature}} - result_{3d_{feature}})$$

where $3d_{feature_{loss}}$ may represent the three-dimensional feature loss, $gt_{3d_{feature}}$ may represent the three-dimensional face reference image sample feature, and $result_{3d_{feature}}$ may represent the three-dimensional predicted face image feature.

In some embodiments, after the two-dimensional feature loss and the three-dimensional feature loss are obtained, the two-dimensional feature loss and the three-dimensional feature loss may be fused to obtain the feature loss. For example, the two-dimensional feature loss and the three-dimensional feature loss may be added to obtain the feature loss. In another example, the two-dimensional feature loss and the three-dimensional feature loss may be weighted and then summed to obtain the feature loss.

In some embodiments, when the discrimination difference between the face reference image sample and the predicted face image is calculated, the face reference image sample and the predicted face image may be scaled, and a scaled image is discriminated by using the discriminator, so as to improve richness of the discrimination loss. For example, the face reference image sample and the predicted face image are scaled respectively to obtain at least one scaled face reference image sample and at least one scaled predicted face image.

The at least one scaled face reference image sample and the at least one scaled predicted face image are discriminated respectively to obtain a first discrimination feature of the scaled face reference image sample and a second discrimination feature of the scaled predicted face image.

The discrimination loss is calculated based on the first discrimination feature and the second discrimination feature.

The scaling may mean changing a size of the image. For example, the size of the image is 256 long×256 wide, and the size of the image may be changed to 128 long×128 wide through scaling.

For example, an original size of the face reference image sample is a, which may be scaled to obtain a face reference image sample with a size of ½a and a face reference image sample with a size of ¼a.

Similarly, assuming that an original size of the predicted face image is b, a predicted face image with a size of ½b and a predicted face image with a size of ¼b may be obtained through scaling.

Then, the at least one scaled face reference image sample and the at least one scaled predicted face image may be discriminated respectively to obtain the first discrimination feature of the scaled face reference image sample and the second discrimination feature of the scaled predicted face image.

For example, the face reference image sample with the original size of a, the face reference image sample with the size of ½a, and the face reference image sample with the size of ¼a may be inputted into the discriminator to obtain discrimination results.

For example, after the face reference image sample with the original size of a, the face reference image sample with the size of ½a, and the face reference image sample with the size of ¼a are inputted into the discriminator, the obtained discrimination results are D(gt_img), D(gt_img_½), and D(gt_img_¼) respectively. The symbol D( ) may represent the discrimination result of the discriminator. gt_img may refer to the face reference image sample with the original size of a, gt_img_½ may refer to the face reference image sample with the size of ½a, and gt_img_¼ may refer to the face reference image sample with the size of ¼a.

In some embodiments, the discrimination results are generally represented by features. For example, D( ) is generally a value ranging from 0 to 1. When the discrimination result is 1, it indicates that the image passes the discrimination. When the discrimination result is 0, it indicates that the image fails the discrimination.

For example, the first discrimination feature may include D(gt_img), D(gt_img_½), and D(gt_img_¼).

In another example, the predicted face image with the original size of b, the predicted face image with the size of ½b, and the predicted face image with the size of ¼b may be inputted into the discriminator to obtain discrimination results.

For example, after the predicted face image with the original size of b, the predicted face image with the size of ½b, and the predicted face image with the size of ¼b are inputted into the discriminator, the obtained discrimination results are D(result), D(result_½), and D(result_¼) respectively. result may refer to the predicted face image with the original size of b, result_½ may refer to the predicted face image with the size of ½b, and result_¼ may refer to the predicted face image with the size of ¼b.

The second discrimination feature may include the discrimination result of the discriminator. For example, the second discrimination feature may include D(result), D(result_½), and D(result_¼).

In some embodiments, the discrimination loss may be calculated by calculating a difference. In another example, the discrimination loss may be calculated by using a cosine similarity, and so on.

In some embodiments, the discrimination loss may be calculated in the following manner:

$$D\_loss = \tfrac{1}{3} * (-\log D(gt\_img) - \log D(result)$$

$$-\log D(gt\_img\_\tfrac{1}{2}) - \log D(result\_\tfrac{1}{2})$$

$$-\log D(gt\_img\_\tfrac{1}{4}) - \log D(result\_\tfrac{1}{4}))$$

where D_loss may be the discrimination loss.

In some embodiments, in order to make an identity feature of the predicted face in the predicted face image as similar as possible to an identity feature of the source face in the face image sample, the face feature loss between the face image sample and the predicted face image may also be calculated.

For example, face feature extraction may be performed on the predicted face image and the face image sample to obtain a face feature of the predicted face image and a face feature of the face image sample. Then, a face feature loss between the face feature of the predicted face image and the face feature of the face image sample is calculated.

In some embodiments, the two-dimensional feature loss may be calculated by calculating a difference. In another example, the two-dimensional feature loss may be calculated by using a cosine similarity, and so on.

In some embodiments, the two-dimensional feature loss may be calculated according to the following formula:

$$id_{loss} = 1 - cosine_{similarity}(result_{id_{feature}}, src_{id_{feature}})$$

where $id_{loss}$ may be the two-dimensional feature loss, $result_{id_{feature}}$ may be the face feature of the predicted face image, and $src_{id_{feature}}$ may be the face feature of the face image sample. $cosine_{similarity}$ may be a calculation manner of the cosine similarity, where $cosine_{similarity}$ may be expressed as follows:

$$cosine_{similarity}(A, B) = \frac{\sum_{i=1}^{n} A_i \times B_i}{\sqrt{\sum_{i=1}^{n}(A_i)^2} \times \sqrt{\sum_{i=1}^{n}(B_i)^2}}$$

where A and B may be vectors, $A_i$ may be a component in the vector A, and $B_i$ may be a component in the vector B. i may refer to an $i^{th}$ component, and n may refer to a total number of components in the vector.

In some embodiments, after the first loss and the face feature loss are obtained, the first loss and the face feature loss may be fused to obtain the second loss. For example, the first loss and the face feature loss may be added to obtain the second loss. In another example, the first loss and the face feature loss may be weighted and summed to obtain the second loss.

205: Update a model parameter of the face image processing model based on the face contour loss.

In some embodiments, a model parameter of the face image processing model may be updated based on the face contour loss. That is, the face image processing model is adjusted to obtain a trained face image processing model.

For example, as shown in FIG. 6, after the face contour loss is obtained, the three-dimensional face contour points of the predicted face image and the three-dimensional face contour points of the face reference image sample may be restricted to being consistent by using the face contour loss.

For example, a model parameter in the preset face image processing model may be adjusted based on the face contour loss to obtain an adjusted face image processing model. Then, the adjusted face image processing model is trained by using the training image sample group. When face contour loss information is less than a certain degree or meets a requirement through the above repeated operations, it indicates that a training purpose is achieved. In this case, a trained image processing model whose performance also meets the requirement may also be obtained.

In some embodiments, the face contour loss and the second loss may also be fused to obtain a third loss, and then the image processing model is adjusted by using the third loss. That is, the model parameter of the face image processing model is updated by using the third loss, to obtain a trained face image processing model. For example, the model parameter of the face image processing model is acquired.

The face contour loss and the second loss are fused to obtain the third loss.

The model parameter is adjusted by using the third loss, to obtain the trained face image processing model.

For example, the face contour and the second loss may be added to obtain the third loss. Then, the model parameter of the preset face image processing model is adjusted by using the third loss, to obtain the trained face image processing model.

In some embodiments, during the training, the preset face image processing model, after learning how to realize face replacement, may learn three-dimensional features so as to predict three-dimensional features of the image, for example, as shown in FIG. 6.

In this embodiment of this application, a training image sample group may be acquired. The training image sample group includes a face image sample, a face template image sample, and a face reference image sample. A template face in the face template image sample is replaced, by using a face image processing model, with a source face in the face image sample to obtain a predicted face image. Three-dimensional face contour point detection is performed on the predicted face image to obtain three-dimensional face contour points of the predicted face image, and three-dimensional face contour point detection is performed on the face reference image sample to obtain three-dimensional face contour points of the face reference image sample. Differences between the three-dimensional face contour points of the predicted face image and the three-dimensional face contour points of the face reference image sample are calculated to obtain a face contour loss between the predicted face image and the face reference image sample. The face image processing model is adjusted based on the face contour loss to obtain a trained face image processing model. The face image processing model is trained by using the three-dimensional face contour points, so that, when the template face in the face template image is replaced with the source face by using the trained face image processing model, the face contour of the source face can be retained in a face image obtained after the replacement, and accuracy of the face image processing method is improved.

In addition, in this embodiment of this application, loss information is calculated on a plurality of different dimensions, and the preset face image processing model is adjusted by using the losses on the plurality of dimensions, so that the preset face image processing model can adjust parameters on different dimensions by using the losses on the plurality of dimensions, and the trained face image processing model has better performance.

According to the method described in the foregoing embodiments, the following further provides detailed descriptions by using examples.

In this embodiment of this application, the method according to this embodiment of this application is introduced with an example in which the training of the face image processing model is integrated into a computer device.

Figure 7:
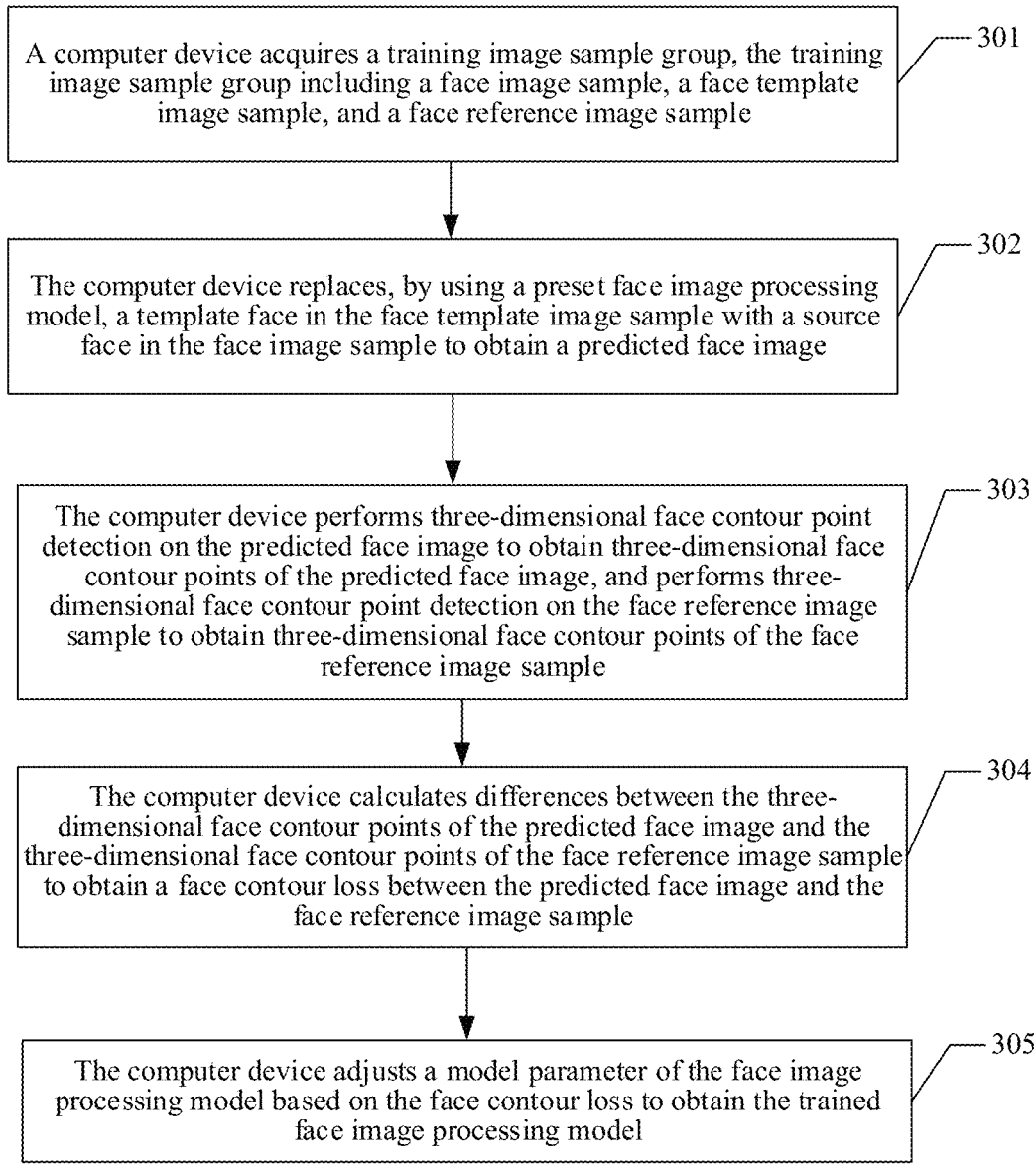
FIG. 7 is another schematic flowchart of a face image processing method according to an embodiment of this application.

In some embodiments, as shown in FIG. 7, a face image processing model training method includes the following steps:

301: A computer device acquires a training image sample group, the training image sample group including a face image sample, a face template image sample, and a face reference image sample.

For example, the face image sample may be represented as source, the face template image sample may be represented as target, and the face reference image sample may be represented as gt_img.

302: The computer device replaces, by using a preset face image processing model, a template face in the face template image sample with a source face in the face image sample to obtain a predicted face image.

For example, the computer device may input the source and the target into an encoder in the preset face image processing model. The encoder may constantly reduce resolution of the source and resolution of the target, and encode the source and the target as an initial face replacement sample feature in a hidden space.

In addition, the computer device may perform feature extraction on the source by using a face feature extraction network to obtain a face feature source_id_feature of the source.

In addition, the computer device may further perform three-dimensional face modeling on the source and the target to obtain a three-dimensional face image sample feature of the face image sample and a three-dimensional face template image sample feature of the face template image sample.

Then, the computer device may transform, by using the preset face image processing model, the initial face replacement sample feature based on a three-dimensional face image sample feature after the fusion to obtain a target face replacement sample feature.

Then, the computer device may replace, by using the preset face image processing model, a template face in the face template image sample with a source face of the face image sample based on the target face replacement sample feature and a face feature of the face image sample to obtain a predicted face image.

The predicted face image may be represented as result.

303: The computer device performs three-dimensional face contour point detection on the predicted face image to obtain three-dimensional face contour points of the predicted face image, and performs three-dimensional face contour point detection on the face reference image sample to obtain three-dimensional face contour points of the face reference image sample.

For example, the computer device may calculate a three-dimensional predicted face image feature (which may be represented as result_3d_feature) of the result.

Then, the computer device may perform three-dimensional key point projection on the three-dimensional predicted face image feature to obtain three-dimensional face key points of the predicted face image. For example, the three-dimensional face key points are shown by the following formula:

$$result\_3d\_points = reconstruction\_without\_tex(result\_3d\_feature)$$

Then, the computer device may select the three-dimensional face contour point from the three-dimensional face key points based on the three-dimensional face key points.

Similarly, the computer device may calculate a three-dimensional face template image sample feature (which may be represented as gt_3d_feature) of the gt_img.

Then, the computer device may perform three-dimensional key point projection on the three-dimensional face template image sample feature to obtain three-dimensional face key points of the face reference image sample. For example, the three-dimensional face key points are shown by the following formula:

$$gt\_3d\_points = reconstruction\_without\_tex(gt\_3d\_feature)$$

where gt_3d_points may be the three-dimensional face key points of the face reference image sample.

304: The computer device calculates differences between the three-dimensional face contour points of the predicted face image and the three-dimensional face contour points of the face reference image sample to obtain a face contour loss between the predicted face image and the face reference image sample.

For example, the face contour loss may be calculated according to the following formula:

$$3d\_point\_loss = abs(gt\_3d\_OutlookPoint - result\_3d\_OutlookPoint)$$

In some embodiments, other losses may also be calculated, and the preset face image processing model is adjusted by using the face contour loss and other losses together, to obtain a trained face image processing model.

For example, a face feature loss, a pixel loss, a feature loss, a discrimination loss, and a face contour loss may be added. Then, the preset face image processing model is adjusted by using a loss obtained by addition to obtain the trained face image processing model.

305: The computer device adjusts a model parameter of the face image processing model based on the face contour loss to obtain the trained face image processing model.

In this embodiment of this application, the computer device may acquire a training image sample group. The training image sample group includes a face image sample, a face template image sample, and a face reference image sample. The computer device may replace, by using a preset face image processing model, a template face in the face template image sample with a source face in the face image sample to obtain a predicted face image. The computer device may perform three-dimensional face contour point detection on the predicted face image to obtain three-dimensional face contour points of the predicted face image, and perform three-dimensional face contour point detection on the face reference image sample to obtain three-dimensional face contour points of the face reference image sample. The computer device calculates differences between the three-dimensional face contour points of the predicted face image and the three-dimensional face contour points of the face reference image sample to obtain a face contour loss between the predicted face image and the face reference image sample. The computer device adjusts the preset face image processing model based on face contour loss information to obtain the trained face image processing model. The preset face image processing model is trained by using the three-dimensional face contour points, so that, when the template face in the face template image is replaced with the source face by using the trained face image processing model, the face contour of the source face can be retained in a face image obtained after the replacement, and accuracy of the face image processing method is improved.

In this embodiment of this application, the method according to this embodiment of this application is introduced with an example in which the training of the face image processing model is integrated into a computer device.

Figure 8:
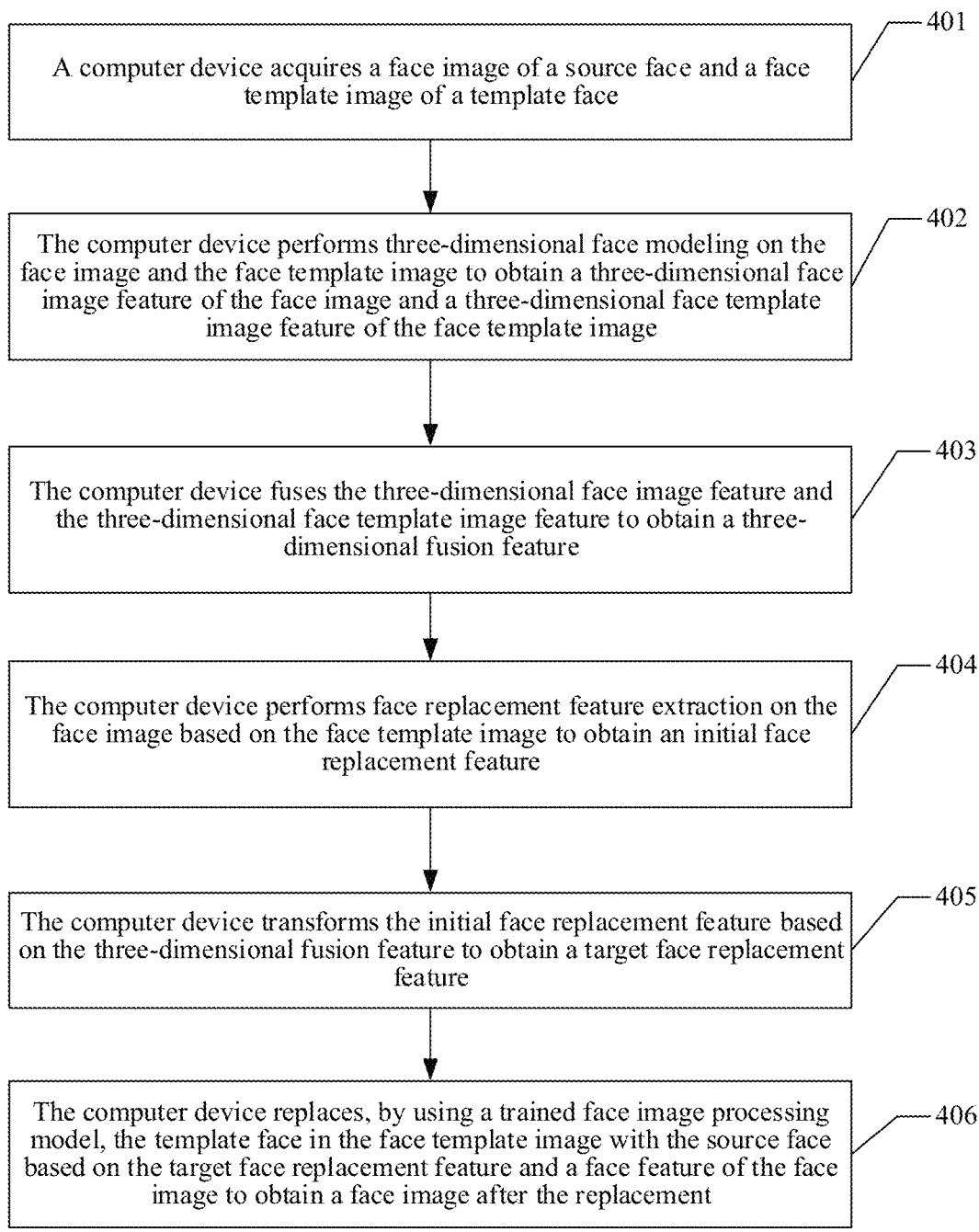
FIG. 8 is another schematic flowchart of a face image processing model training method according to an embodiment of this application.

In some embodiments, as shown in FIG. 8, a face image processing method includes the following steps:

401: A computer device acquires a face image of a source face and a face template image of a template face.

402: The computer device performs three-dimensional face modeling on the face image and the face template image to obtain a three-dimensional face image feature of the face image and a three-dimensional face template image feature of the face template image.

403: The computer device fuses the three-dimensional face image feature and the three-dimensional face template image feature to obtain a three-dimensional fusion feature.

404: The computer device performs face replacement feature extraction on the face image based on the face template image to obtain an initial face replacement feature.

405: The computer device transforms the initial face replacement feature based on the three-dimensional fusion feature to obtain a target face replacement feature.

406: The computer device replaces, by using a trained face image processing model, the template face in the face template image with the source face based on the target face replacement feature and a face feature of the face image to obtain a target face image after the replacement.

In this embodiment of this application, the computer device acquires a face image of a source face and a face template image of a template face. The computer device performs three-dimensional face modeling on the face image and the face template image to obtain a three-dimensional face image feature of the face image and a three-dimensional face template image feature of the face template image. The computer device fuses the three-dimensional face image feature and the three-dimensional face template image feature to obtain a three-dimensional fusion feature. The computer device performs face replacement feature extraction on the face image based on the face template image to obtain an initial face replacement feature. The computer device transforms the initial face replacement feature based on the three-dimensional fusion feature to obtain a target face replacement feature. The computer device replaces, by using a trained face image processing model, the template face in the face template image with the source face based on the target face replacement feature and a face feature of the face image to obtain a target face image after the replacement. In this embodiment of this application, more features of the face image and the face template image may be acquired respectively from the perspective of the two-dimensional space and the three-dimensional space, so that more information is available for face replacement processing, and accuracy of the face image processing method is improved.

In order to better implement the face image processing method according to this embodiment of this application, an embodiment of this application further provides a face image processing apparatus. The face image processing apparatus may be integrated into a computer device. Terms have meanings the same as those in the foregoing face image processing method. For specific implementation details, reference may be made to the description in the method embodiments.

Figure 9:
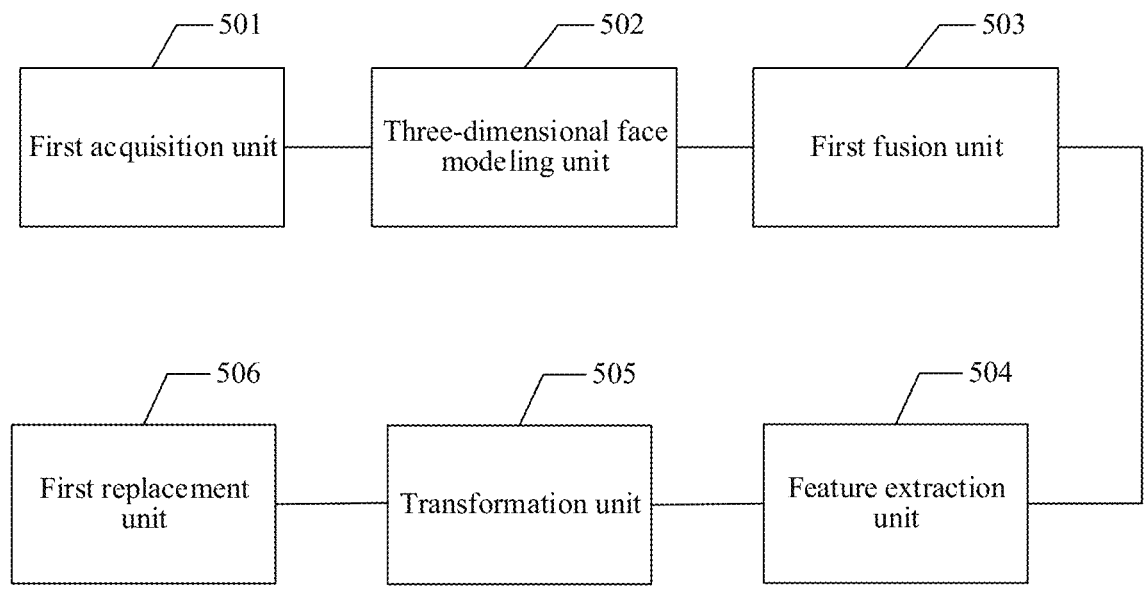
FIG. 9 is a schematic structural diagram of a face image processing apparatus according to an embodiment of this application.

In some embodiments, a face image processing apparatus is provided. The face image processing apparatus may be integrated into a computer device. As shown in FIG. 9, the face image processing apparatus includes: a first acquisition unit 501, a three-dimensional face modeling unit 502, a first fusion unit 503, a feature extraction unit 504, a transformation unit 505, and a first replacement unit 506, which are specifically as follows:

The first acquisition unit 501 is configured to acquire a face image of a source face and a face template image of a template face.

The three-dimensional face modeling unit 502 is configured to perform three-dimensional face modeling on the face image and the face template image to obtain a three-dimensional face image feature of the face image and a three-dimensional face template image feature of the face template image.

The first fusion unit 503 is configured to fuse the three-dimensional face image feature and the three-dimensional face template image feature to obtain a three-dimensional fusion feature.

The feature extraction unit 504 is configured to perform face replacement feature extraction on the face image based on the face template image to obtain an initial face replacement feature.

The transformation unit 505 is configured to transform the initial face replacement feature based on the three-dimensional fusion feature to obtain a target face replacement feature.

The first replacement unit 506 is configured to replace the template face in the face template image with the source face based on the target face replacement feature to obtain a target face image after the replacement.

In some embodiments, the first fusion unit 503 includes:
a first extraction subunit configured to extract a source face identity feature corresponding to the face image from the three-dimensional face image feature;
a second extraction subunit configured to extract a template face image feature corresponding to the face template image from the three-dimensional face template image feature; and
a first fusion subunit configured to fuse the source face identity feature and the template face image feature to obtain the three-dimensional fusion feature.

In some embodiments, the feature extraction unit 504 includes:
a first encoding subunit configured to encode the face template image to obtain a first encoding feature of the face template image;
a second encoding subunit configured to encode the face image to obtain a second encoding feature of the face image; and
a first adjustment subunit configured to adjust the first encoding feature based on the second encoding feature to obtain the initial face replacement feature.

In some embodiments, the transformation unit 505 includes:
a first statistics subunit configured to perform first logic operation on the three-dimensional fusion feature to obtain a three-dimensional face image feature after the first logic operation, and perform second logic operation on the initial face replacement feature to obtain a face replacement feature after the second logic operation;
a second statistics subunit configured to perform third logic operation on the initial face replacement feature and the face replacement feature after the second logic operation to obtain a face replacement feature after the third logic operation; and
a logic operation processing subunit configured to perform fourth logic operation on the face replacement feature after the third logic operation and the three-dimensional face image feature after the first logic operation to obtain the target face replacement feature.

The foregoing units may be implemented as independent entities may be combined arbitrarily and implemented as the same entity or a plurality of entities. For specific implementation of the foregoing units, reference can be made to the foregoing method embodiments, so the details are not described herein again.

Accuracy of replacement of the face image can be improved through the above face image processing apparatus.

In addition, in some embodiments, a face image processing model training apparatus is further provided. The face image processing model training apparatus may be integrated into a computer device. Terms have meanings the same as those in the foregoing face image processing model training method. For specific implementation details, reference may be made to the description in the method embodiments.

Figure 10:
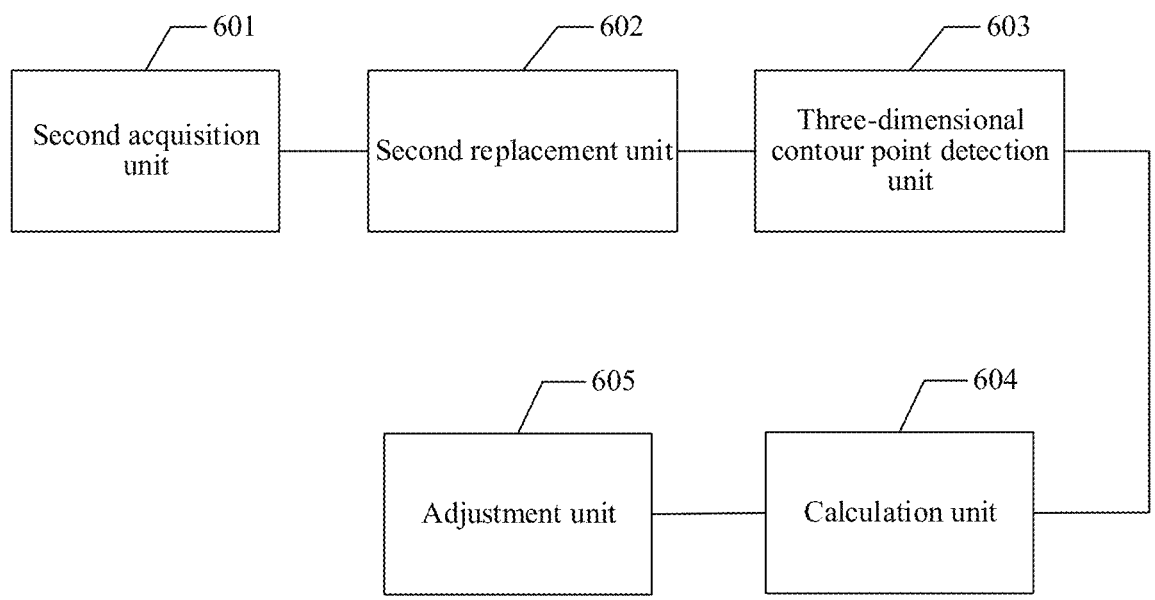
FIG. 10 is a schematic structural diagram of a face image processing model training apparatus according to an embodiment of this application.

In some embodiments, a face image processing model training apparatus is provided. The face image processing model training apparatus may be integrated into a computer device. As shown in FIG. 10, the face image processing model training apparatus includes: a second acquisition unit 601, a second replacement unit 602, a three-dimensional face contour point detection unit 603, a calculation unit 604, and an adjustment unit 605.

The second acquisition unit 601 is configured to acquire a training image sample group, the training image sample group including a face image sample, a face template image sample, and a face reference image sample.

The second replacement unit 602 is configured to replace, by using a face image processing model, a template face in the face template image sample with a source face in the face image sample to obtain a predicted face image.

The three-dimensional face contour point detection unit 603 is configured to perform three-dimensional face contour point detection on the predicted face image to obtain three-dimensional face contour points of the predicted face image, and perform three-dimensional face contour point detection on the face reference image sample to obtain three-dimensional face contour points of the face reference image sample.

The calculation unit 604 is configured to acquire differences between the three-dimensional face contour points of the predicted face image and the three-dimensional face contour points of the face reference image sample to obtain a face contour loss between the predicted face image and the face reference image sample.

The adjustment unit 605 is configured to adjust the face image processing model based on the face contour loss to obtain a trained face image processing model.

In some embodiments, the three-dimensional face contour point detection unit 603 includes:
 a three-dimensional face modeling subunit configured to perform three-dimensional face modeling on the predicted face image to obtain a three-dimensional predicted face image feature of the predicted face image;
 a three-dimensional key point projection subunit configured to perform three-dimensional key point projection on the three-dimensional predicted face image feature to obtain three-dimensional face key points of the predicted face image; and
 a screening subunit configured to select the three-dimensional face contour point from the three-dimensional face key points based on the three-dimensional face key points.

In some embodiments, the three-dimensional key point projection subunit includes:
 an extraction module configured to extract a predicted face identity feature and a predicted face expression feature of the predicted face image from the three-dimensional predicted face image feature; and
 a three-dimensional key point projection module configured to perform, by using preset transfer parameters, three-dimensional key point projection on the predicted face identity feature and the predicted face expression feature to obtain the three-dimensional face key points of the predicted face image.

In some embodiments, the face image processing model training apparatus further includes:
 a first calculation unit configured to calculate differences between the face reference image sample and the predicted face image other than the three-dimensional face contour points to obtain a first loss between the face reference image sample and the predicted face image, the first loss including losses other than the face contour loss;
 a second calculation unit configured to calculate a face feature loss between the face image sample and the predicted face image; and
 a second fusion unit configured to fuse the first loss and the face feature loss to obtain a second loss.

In some embodiments, the first calculation unit includes:
 a first calculation subunit configured to calculate a pixel difference between the face reference image sample and the predicted face image to obtain the pixel loss;
 a second calculation subunit configured to calculate a feature difference between the face reference image sample and the predicted face image to obtain a feature loss;
 a second calculation subunit configured to calculate a discrimination difference between the face reference image sample and the predicted face image to obtain a discrimination loss;

In some embodiments, the second calculation subunit includes:
 a first calculation module configured to calculate a two-dimensional feature difference between the face reference image sample and the predicted face image to obtain a two-dimensional feature loss;
 a third calculation module configured to calculate a three-dimensional feature difference between the face reference image sample and the predicted face image to obtain a three-dimensional feature loss;
 a first fusion module configured to fuse the two-dimensional feature loss and the three-dimensional feature loss to obtain the feature loss.

In some embodiments, the third calculation subunit includes:
 a scaling module configured to scale the face reference image sample and the predicted face image respectively to obtain at least one scaled face reference image sample and at least one scaled predicted face image;
 a discrimination module configured to discriminate the at least one scaled face reference image sample and the at least one scaled predicted face image respectively to obtain a first discrimination feature of the scaled face reference image sample and a second discrimination feature of the scaled predicted face image; and
 a third calculation module configured to calculate the discrimination loss based on the first discrimination feature and the second discrimination feature.

In some embodiments, the adjustment unit 605 includes:
 an acquisition subunit configured to acquire a model parameter of the trained face image processing model;
 a second fusion subunit configured to fuse the face contour loss and the second loss to obtain a third loss; and
 a parameter adjustment unit configured to adjust, by using the third loss, the model parameter to obtain the trained face image processing model.

Figure 11:
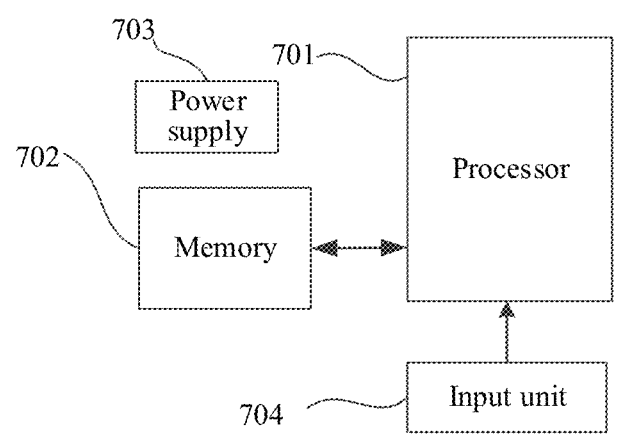
FIG. 11 is a schematic structural diagram of a terminal according to an embodiment of this application.

An embodiment of this application further provides a computer device. The computer device may include a terminal or a server. For example, the terminal may be a mobile phone, a tablet computer, or the like. In another example, the computer device may be a server or the like. FIG. 11 is a schematic structural diagram of a terminal according to an embodiment of this application.

The computer device may include components such as a processor 701 including one or more processing cores, a memory 702 including one or more computer-readable storage media, a power supply 703, and an input unit 704. A person skilled in the art may understand that, the structure of the computer device shown in FIG. 11 does not constitute a limitation to the computer device. The computer device may comprise components that are more or fewer than those shown in the figure, or some components may be combined, or a different component deployment may be used. where the processor 701 is a control center of the computer device, and connects various parts of the entire computer device by using various interfaces and lines. By running or executing software programs and/or modules stored in the memory 702, and invoking data stored in the memory 702, the processor performs various functions and data processing of the computer device, thereby performing overall monitoring on the computer device. In some embodiments, the processor 701 may include one or more processing cores. Preferably, the processor 701 may integrate an application processor and a modem. The application processor mainly processes an operating system, a user interface, an application, and the like. The modem mainly processes wireless communication. It can be understood that, the modem processor may not be integrated into the processor 701.

The memory 702 may be configured to store a software program and module. The processor 701 runs the software program and module stored in the memory 702, to implement various functional applications and data processing. The memory 702 may mainly include a program storage area and a data storage area. The program storage area may store an operating system, an application program required by at least one function (for example, a sound playback function and an image display function), and the like. The data storage area may store data created according to use of the computer device. In addition, the memory 702 may include a high speed RAM, and may further include a non-volatile memory, such as at least one magnetic disk storage device, a flash memory, or other volatile solid-state storage devices. Correspondingly, the memory 702 may further include a memory controller, so that the processor 701 can access the memory 702.

The computer device further includes the power supply 703 for supplying power to the components. For example, the power supply 703 may be logically connected to the processor 701 by using a power management system, thereby implementing functions such as charging, discharging, and power consumption management by using the power management system. The power supply 703 may further include one or more direct current or alternating current power supplies, a re-charging system, a power failure detection circuit, a power supply converter or inverter, a power supply state indicator, and any other component.

The computer device may further include the input unit 704. The input unit 704 may be configured to receive input digit or character information and generate keyboard, mouse, joystick, optical, or trackball signal input related to user settings and function control.

Although not shown in the figure, the computer device may further include a display unit, and the like. Details are not described herein again. In this embodiment, the processor 701 in the network device may load, according to the following instructions, executable files corresponding to processes of one or more application programs into the memory 702. The processor 701 runs the application programs stored in the memory 702, to implement the face image processing method or face image processing model training method in the embodiments of this application.

Because the computer program stored in the storage medium may perform the steps of any face image processing method provided in the embodiments of this application, the computer program can implement beneficial effects that may be implemented by any face image processing method in the embodiments of this application. For details, refer to the foregoing embodiments. Details are not described herein again.

The face image processing method and the face image processing model training method provided in the embodiments of this application are described in detail above. The principles and implementations of this application are described through specific examples in this specification, and the descriptions of the embodiments are only intended to help understand the methods and core ideas of this application. Meanwhile, a person of ordinary skill in the art may make modifications to the specific implementations and application scopes according to the ideas of this application. In conclusion, the content of the specification should not be construed as a limitation to this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A face image processing method performed by a computer device, the method comprising:
   acquiring a face image of a source face and a face template image of a template face;
   performing three-dimensional face modeling on the face image and the face template image to obtain a three-dimensional face image feature of the face image and a three-dimensional face template image feature of the face template image;
   extracting a source face identity feature of the face image from the three-dimensional face image feature;
   extracting a template face image feature of the face template image from the three-dimensional face template image feature;
   fusing the source face identity feature and the template face image feature to obtain a three-dimensional fusion feature;
   performing face replacement feature extraction on the face image based on the face template image to obtain an initial face replacement feature;
   transforming the initial face replacement feature based on the three-dimensional fusion feature to obtain a target face replacement feature; and
   replacing the template face in the face template image with the source face based on the target face replacement feature to obtain a target face image after the replacement, wherein the target face image preserves identity and shape of the source face and pose and expression of the template face.

2. The method according to claim 1, wherein the performing face replacement feature extraction on the face image based on the face template image to obtain an initial face replacement feature comprises:
   encoding the face template image to obtain a first encoding feature of the face template image;
   encoding the face image to obtain a second encoding feature of the face image; and
   adjusting the first encoding feature based on the second encoding feature to obtain the initial face replacement feature.

3. The method according to claim 1, wherein the transforming the initial face replacement feature based on the three-dimensional fusion feature to obtain a target face replacement feature comprises:

performing first logic operation on the three-dimensional fusion feature to obtain a three-dimensional face image feature after the first logic operation, and performing second logic operation on the initial face replacement feature to obtain a face replacement feature after the second logic operation;

performing third logic operation on the initial face replacement feature and the face replacement feature after the second logic operation to obtain a face replacement feature after the third logic operation; and performing fourth logic operation on the face replacement feature after the third logic operation and the three-dimensional face image feature after the first logic operation to obtain the target face replacement feature.

4. The method according to claim 3, wherein the three-dimensional fusion feature comprises at least two sub three-dimensional fusion features, each of the sub three-dimensional fusion features corresponding to a feature dimension; and the performing first logic operation on the three-dimensional fusion feature to obtain a three-dimensional face image feature after the first logic operation comprises:

determining a standard deviation of the at least two sub three-dimensional fusion features, and taking the standard deviation as the three-dimensional face image feature after the first logic operation.

5. The method according to claim 1, wherein the fusing the source face identity feature and the template face image feature to obtain a three-dimensional fusion feature comprises:

fusing, by using a face image processing model, the fusing the source face identity feature and the template face image feature to obtain the three-dimensional fusion feature;

the performing face replacement feature extraction on the face image based on the face template image to obtain an initial face replacement feature comprises:

performing, by using the face image processing model, face replacement feature extraction on the face image based on the face template image to obtain the initial face replacement feature; and the transforming the initial face replacement feature based on the three-dimensional fusion feature to obtain a target face replacement feature comprises:

transforming, by using the face image processing model, the initial face replacement feature based on the three-dimensional fusion feature to obtain the target face replacement feature.

6. The method according to claim 1, wherein the replacing the template face in the face template image with the source face based on the target face replacement feature to obtain a target face image after the replacement comprises:

performing feature extraction on the face image to obtain a face feature of the face image; and replacing the template face in the face template image with the source face based on the target face replacement feature and the face feature of the face image to obtain the face image after the replacement.

7. A computer device, comprising:
a memory, configured to store executable instructions; and
a processor, configured to, by executing the executable instructions stored in the memory, perform a face image processing method, the method including:
acquiring a face image of a source face and a face template image of a template face;
performing three-dimensional face modeling on the face image and the face template image to obtain a three-dimensional face image feature of the face image and a three-dimensional face template image feature of the face template image;
extracting a source face identity feature of the face image from the three-dimensional face image feature;
extracting a template face image feature of the face template image from the three-dimensional face template image feature;
fusing the source face identity feature and the template face image feature to obtain a three-dimensional fusion feature;
performing face replacement feature extraction on the face image based on the face template image to obtain an initial face replacement feature;
transforming the initial face replacement feature based on the three-dimensional fusion feature to obtain a target face replacement feature; and
replacing the template face in the face template image with the source face based on the target face replacement feature to obtain a target face image after the replacement, wherein the target face image preserves identity and shape of the source face and pose and expression of the template face.

8. The computer device according to claim 7, wherein the performing face replacement feature extraction on the face image based on the face template image to obtain an initial face replacement feature comprises:

encoding the face template image to obtain a first encoding feature of the face template image;

encoding the face image to obtain a second encoding feature of the face image; and adjusting the first encoding feature based on the second encoding feature to obtain the initial face replacement feature.

9. The computer device according to claim 7, wherein the transforming the initial face replacement feature based on the three-dimensional fusion feature to obtain a target face replacement feature comprises:

performing first logic operation on the three-dimensional fusion feature to obtain a three-dimensional face image feature after the first logic operation, and performing second logic operation on the initial face replacement feature to obtain a face replacement feature after the second logic operation;

performing third logic operation on the initial face replacement feature and the face replacement feature after the second logic operation to obtain a face replacement feature after the third logic operation; and performing fourth logic operation on the face replacement feature after the third logic operation and the three-dimensional face image feature after the first logic operation to obtain the target face replacement feature.

10. The computer device according to claim 9, wherein the three-dimensional fusion feature comprises at least two sub three-dimensional fusion features, each of the sub three-dimensional fusion features corresponding to a feature dimension; and the performing first logic operation on the three-dimensional fusion feature to obtain a three-dimensional face image feature after the first logic operation comprises:
determining a standard deviation of the at least two sub three-dimensional fusion features, and taking the standard deviation as the three-dimensional face image feature after the first logic operation.

11. The computer device according to claim 7, wherein the fusing the source face identity feature and the template face image feature to obtain a three-dimensional fusion feature comprises:
fusing, by using a face image processing model, the fusing the source face identity feature and the template face image feature to obtain the three-dimensional fusion feature;
the performing face replacement feature extraction on the face image based on the face template image to obtain an initial face replacement feature comprises:
performing, by using the face image processing model, face replacement feature extraction on the face image based on the face template image to obtain the initial face replacement feature; and
the transforming the initial face replacement feature based on the three-dimensional fusion feature to obtain a target face replacement feature comprises:
transforming, by using the face image processing model, the initial face replacement feature based on the three-dimensional fusion feature to obtain the target face replacement feature.

12. The computer device according to claim 7, wherein the replacing the template face in the face template image with the source face based on the target face replacement feature to obtain a target face image after the replacement comprises:
performing feature extraction on the face image to obtain a face feature of the face image; and
replacing the template face in the face template image with the source face based on the target face replacement feature and the face feature of the face image to obtain the face image after the replacement.

13. A non-transitory computer-readable storage medium, comprising computer executable instructions, and the computer executable instructions, when executed by a processor of an electronic device, causing the electronic device to implement a face image processing method, the method including:
acquiring a face image of a source face and a face template image of a template face;
performing three-dimensional face modeling on the face image and the face template image to obtain a three-dimensional face image feature of the face image and a three-dimensional face template image feature of the face template image;
extracting a source face identity feature of the face image from the three-dimensional face image feature;
extracting a template face image feature of the face template image from the three-dimensional face template image feature;
fusing the source face identity feature and the template face image feature to obtain a three-dimensional fusion feature;
performing face replacement feature extraction on the face image based on the face template image to obtain an initial face replacement feature;
transforming the initial face replacement feature based on the three-dimensional fusion feature to obtain a target face replacement feature; and
replacing the template face in the face template image with the source face based on the target face replacement feature to obtain a target face image after the replacement, wherein the target face image preserves identity and shape of the source face and pose and expression of the template face.

14. The non-transitory computer-readable storage medium according to claim 13, wherein the performing face replacement feature extraction on the face image based on the face template image to obtain an initial face replacement feature comprises:
encoding the face template image to obtain a first encoding feature of the face template image;
encoding the face image to obtain a second encoding feature of the face image; and
adjusting the first encoding feature based on the second encoding feature to obtain the initial face replacement feature.

15. The non-transitory computer-readable storage medium according to claim 13, wherein the transforming the initial face replacement feature based on the three-dimensional fusion feature to obtain a target face replacement feature comprises:
performing first logic operation on the three-dimensional fusion feature to obtain a three-dimensional face image feature after the first logic operation, and performing second logic operation on the initial face replacement feature to obtain a face replacement feature after the second logic operation;
performing third logic operation on the initial face replacement feature and the face replacement feature after the second logic operation to obtain a face replacement feature after the third logic operation; and
performing fourth logic operation on the face replacement feature after the third logic operation and the three-dimensional face image feature after the first logic operation to obtain the target face replacement feature.

16. The non-transitory computer-readable storage medium according to claim 13, wherein the fusing the source face identity feature and the template face image feature to obtain a three-dimensional fusion feature comprises:
fusing, by using a face image processing model, the fusing the source face identity feature and the template face image feature to obtain the three-dimensional fusion feature;
the performing face replacement feature extraction on the face image based on the face template image to obtain an initial face replacement feature comprises:
performing, by using the face image processing model, face replacement feature extraction on the face image based on the face template image to obtain the initial face replacement feature; and
the transforming the initial face replacement feature based on the three-dimensional fusion feature to obtain a target face replacement feature comprises:
transforming, by using the face image processing model, the initial face replacement feature based on the three-dimensional fusion feature to obtain the target face replacement feature.

17. The non-transitory computer-readable storage medium according to claim 13, wherein the replacing the template face in the face template image with the source face based on the target face replacement feature to obtain a target face image after the replacement comprises:
performing feature extraction on the face image to obtain a face feature of the face image; and replacing the template face in the face template image with the source face based on the target face replacement feature and the face feature of the face image to obtain the face image after the replacement.

* * * * *